(12) United States Patent
Utsunomiya et al.

(10) Patent No.: US 7,372,508 B2
(45) Date of Patent: *May 13, 2008

(54) INFORMATION OUTPUTTING APPARATUS, INFORMATION REPORTING METHOD AND INFORMATION SIGNAL SUPPLY ROUTE SELECTING METHOD

(75) Inventors: Hiroshi Utsunomiya, Chiba (JP); Satoshi Kobayashi, Tokyo (JP); Futoshi Kaibuki, Tokyo (JP)

(73) Assignee: Sony Corporation, Tokyo (JP)

( * ) Notice: Subject to any disclaimer, the term of this patent is extended or adjusted under 35 U.S.C. 154(b) by 795 days.

This patent is subject to a terminal disclaimer.

(21) Appl. No.: 10/836,347

(22) Filed: May 3, 2004

(65) Prior Publication Data

US 2004/0221069 A1 Nov. 4, 2004

Related U.S. Application Data

(63) Continuation of application No. 09/657,334, filed on Sep. 7, 2000, now Pat. No. 6,738,101.

(30) Foreign Application Priority Data

Sep. 16, 1999 (JP) ................................. 11-261447

(51) Int. Cl.
*H04N 5/222* (2006.01)
(52) U.S. Cl. ...................... 348/722; 348/558; 348/552; 348/563
(58) Field of Classification Search ................ 348/722, 348/704–705, 552, 718–719, 554–555, 558, 348/563–564, 569; 700/83, 17, 94, 11, 19; *H04N 5/222*
See application file for complete search history.

(56) References Cited

U.S. PATENT DOCUMENTS 4,652,874 A 3/1987 Loyer (Continued)

FOREIGN PATENT DOCUMENTS

DE 31 51 492 A1 7/1983

(Continued)

OTHER PUBLICATIONS

A. Gefrides et al., "Standard Bus Connects up to 126 Peripherals: Plug and Play With USB," Computers XXXI (1996) No. 3, May 1996, pp. 36-38.

(Continued)

*Primary Examiner*—Trang U. Tran
(74) *Attorney, Agent, or Firm*—Oblon, Spivak, McClelland, Maier & Neustadt, P.C.

(57) ABSTRACT

The present invention presents an information-outputting apparatus, an information-reporting method and an information-signal-supply-route-selecting method, which provide a digital-content utilization environment giving the user a high degree of freedom to make use of the apparatus and the methods.

The information-outputting apparatus receives an isochronous packet transmitted by a source external apparatus by adoption of an isochronous communication method through a digital bus connecting the external apparatus to the information-outputting apparatus. In the information-outputting apparatus, an IEEE 1394 I/F circuit extracts information on the source electronic apparatus and information on the transmission format. A control unit supplies these pieces of information to an OSD-generating circuit for displaying them on a screen of a display unit employed in the information-outputting apparatus.

14 Claims, 12 Drawing Sheets

U.S. PATENT DOCUMENTS

| | | |
|---|---|---|
| 4,723,120 A | 2/1988 | Petty, Jr. |
| 4,903,016 A | 2/1990 | Murai et al. |
| 5,007,051 A | 4/1991 | Dolkas et al. |
| 5,400,246 A | 3/1995 | Wilson et al. |
| 5,418,527 A | 5/1995 | Yashiro |
| 5,420,724 A | 5/1995 | Kawamura et al. |
| 5,455,569 A | 10/1995 | Sherman et al. |
| 5,475,835 A | 12/1995 | Hickey |
| 5,481,750 A | 1/1996 | Parise et al. |
| 5,515,211 A | 5/1996 | Kawamura |
| 5,537,605 A | 7/1996 | Teece |
| 5,539,390 A | 7/1996 | Nagano et al. |
| 5,657,221 A | 8/1997 | Warman et al. |
| 5,687,334 A | 11/1997 | Davis et al. |
| 5,712,834 A | 1/1998 | Nagano et al. |
| 5,729,717 A | 3/1998 | Tamada et al. |
| 5,778,064 A | 7/1998 | Kori et al. |
| 5,787,259 A | 7/1998 | Haroun et al. |
| 5,790,876 A | 8/1998 | Shima et al. |
| 5,793,366 A | 8/1998 | Mano et al. |
| 5,815,631 A | 9/1998 | Sugiyama et al. |
| 5,847,771 A | 12/1998 | Cloutier et al. |
| 5,848,240 A | 12/1998 | Yamamoto |
| 5,850,573 A | 12/1998 | Wada |
| 5,875,108 A | 2/1999 | Hoffberg et al. |
| 5,887,193 A | 3/1999 | Takahashi et al. |
| 5,963,450 A | 10/1999 | Dew |
| 5,973,748 A | 10/1999 | Horiguchi et al. |
| 5,987,126 A | 11/1999 | Okuyama et al. |
| 6,047,103 A | 4/2000 | Yamauchi et al. |
| 6,253,114 B1 | 6/2001 | Takihara |
| 6,408,350 B1 | 6/2002 | Kawamura et al. |
| 6,487,589 B1 | 11/2002 | Yoshino et al. |
| 6,560,221 B1 | 5/2003 | Hara et al. |
| 6,738,101 B1 * | 5/2004 | Utsunomiya et al. ....... 348/722 |

FOREIGN PATENT DOCUMENTS

| | | |
|---|---|---|
| EP | 0 371 719 A2 | 6/1990 |
| EP | 0 573 204 A2 | 12/1993 |
| EP | 0 626 635 A2 | 11/1994 |
| EP | 0 637 157 A2 | 2/1995 |
| EP | 0 727 729 A1 | 8/1996 |
| JP | 4-97468 | 3/1992 |
| JP | 7-134628 | 5/1995 |
| WO | WO 96/07971 | 3/1996 |

OTHER PUBLICATIONS

G. Hoffman et al., "IEEE 1394: A Ubiquitous Bus," IEEE May 3, 1995, pp. 334-338.

D. Hursky, "Networking Scheme Exploits Existing RS-232 Interface," Electronic Design, vol. 35, No. 13, May 1987., pp. 65-68.

IEEE Standard For a High Performance Serial Bus, IEEE Computer Society, IEEE Standard 1394-1995, Aug. 1996.

* cited by examiner

F I G. 2A
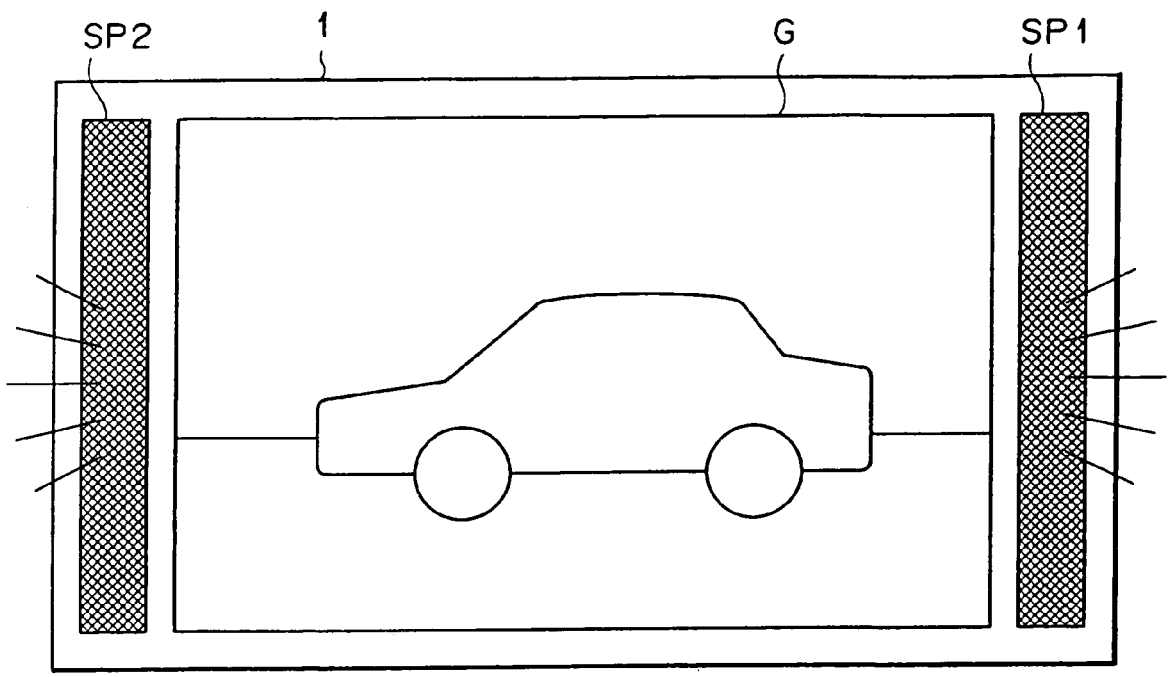
F I G. 2B
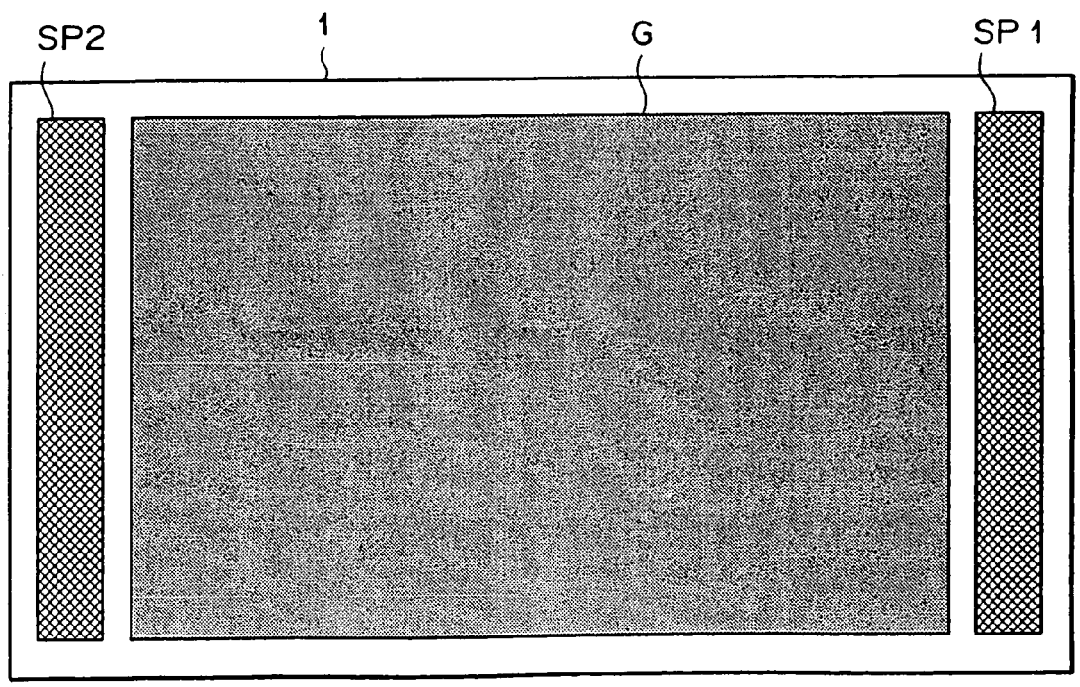

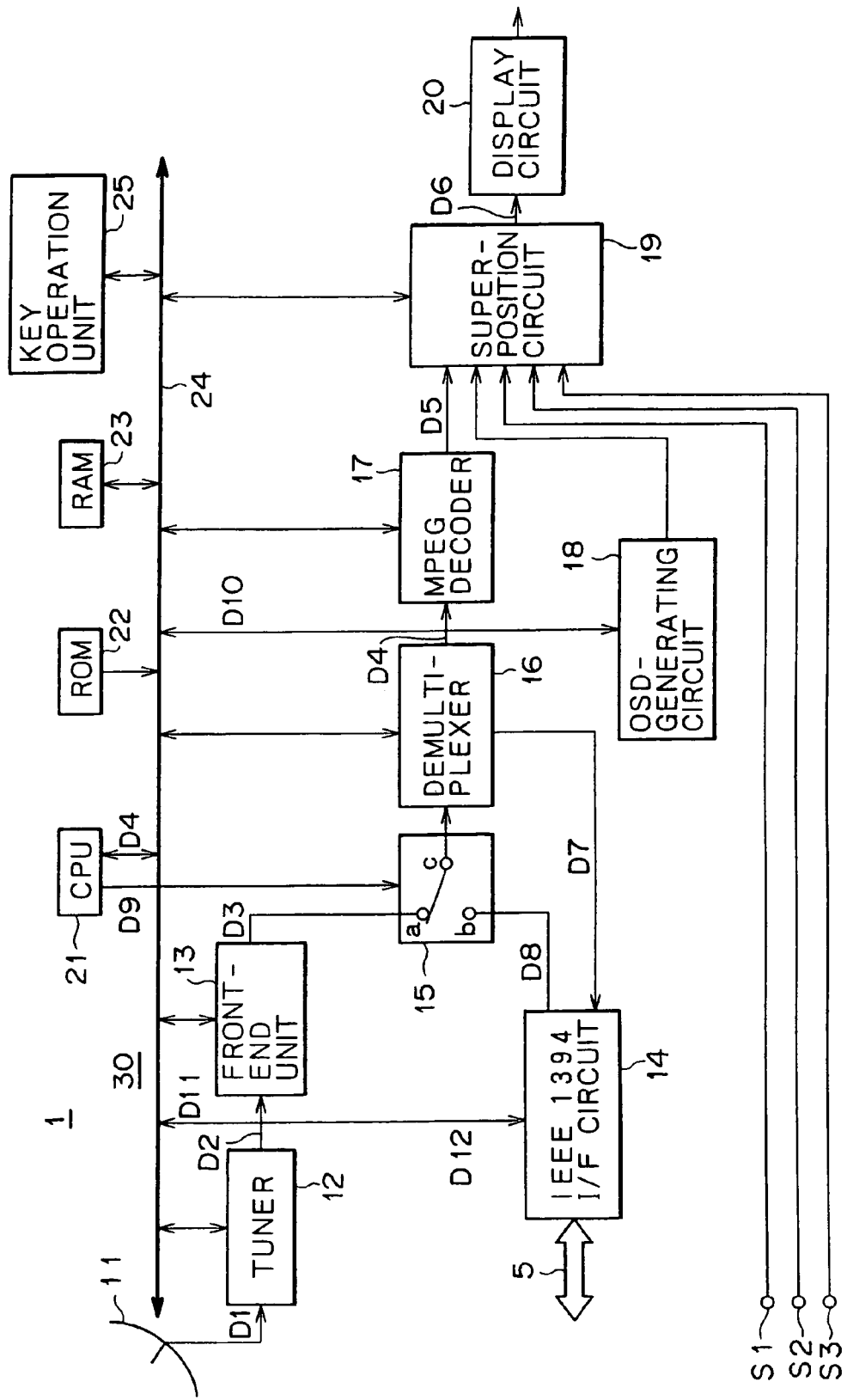

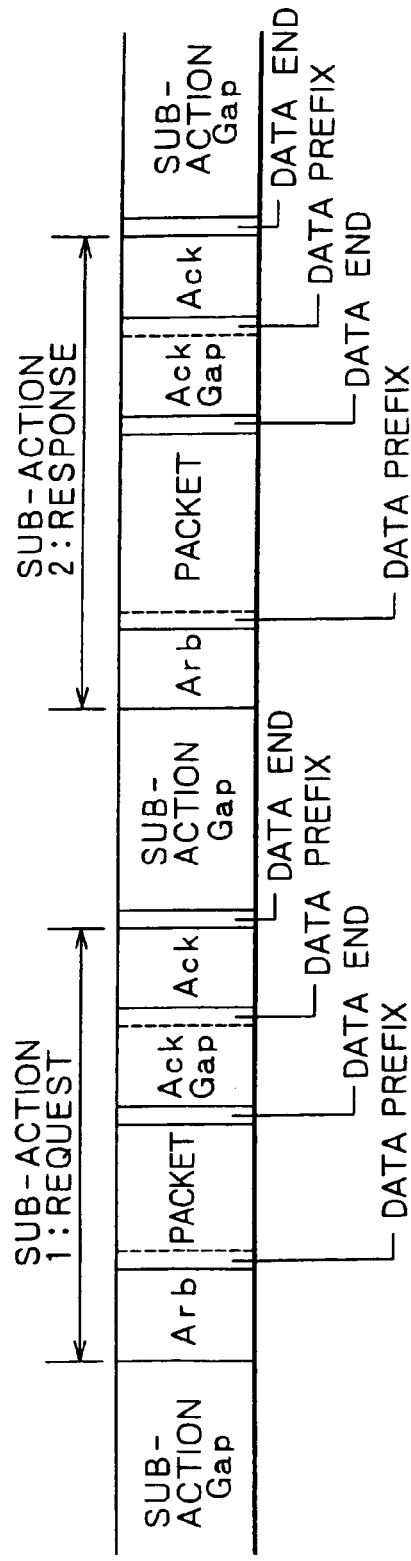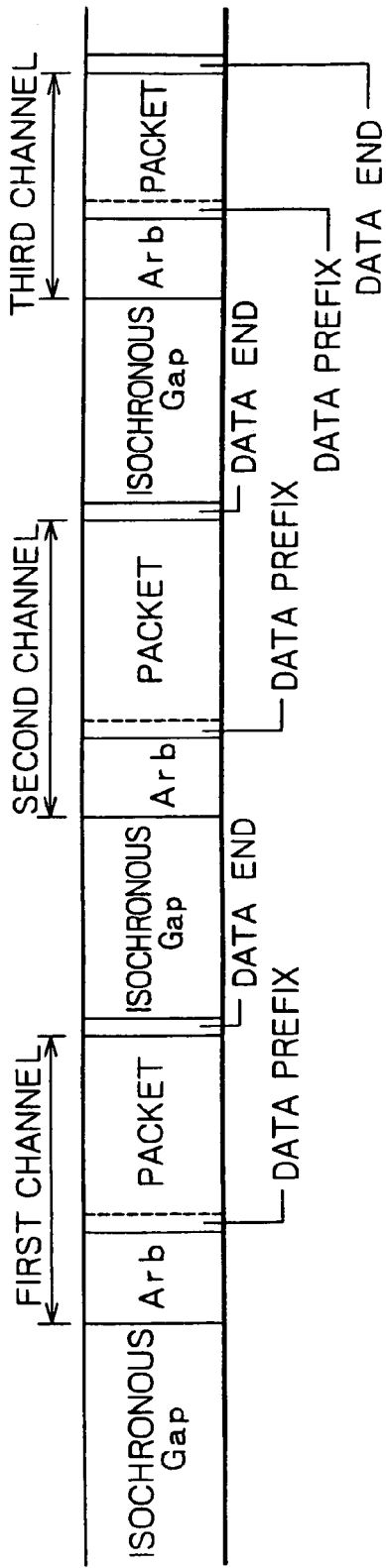

FIG. 7

| TRANSMISSION CHANNEL No. | | TRANSMISSION SOURCE ID | FORMAT | ENCRYPTION | ACTIVE |
|---|---|---|---|---|---|
| DIGITAL ROWS | DIGITAL 0 | 2 | DV | NO | ○ |
| | DIGITAL 1 | 4 | MPEG | YES | |
| | DIGITAL 2 | 5 | DV | NO | |
| ANALOG ROWS | ANALOG 0 | 2 | DV | NO | |
| | ANALOG 1 | 4 | MPEG | YES | |
| | ANALOG 2 | 5 | DV | NO | |
| INTERNAL TUNER 0 | | | | | |

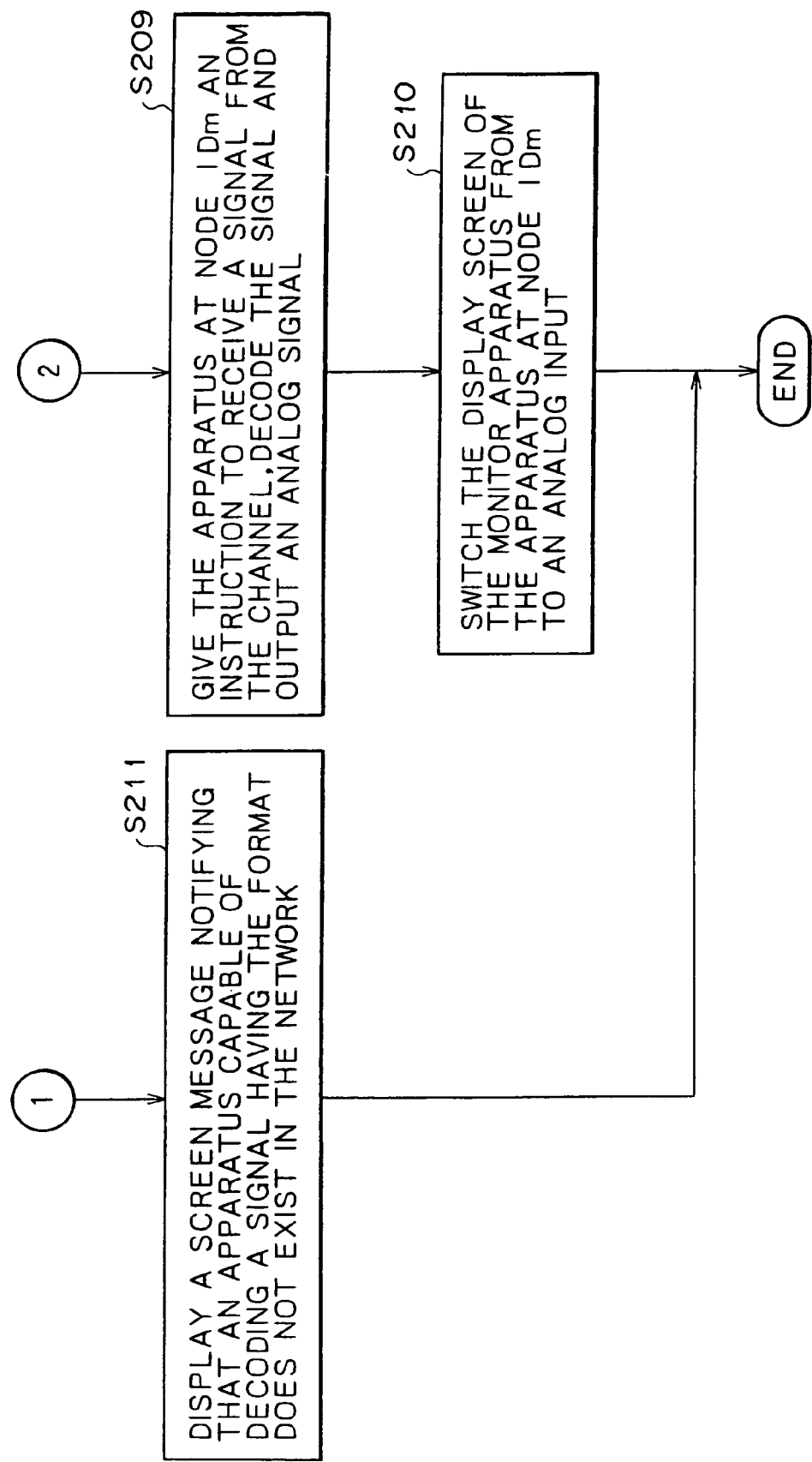

INFORMATION OUTPUTTING APPARATUS, INFORMATION REPORTING METHOD AND INFORMATION SIGNAL SUPPLY ROUTE SELECTING METHOD

BACKGROUND OF THE INVENTION

The present invention relates to an information-outputting apparatus such as a monitor apparatus connected to a network connected to a plurality of electronic apparatuses through digital buses each conforming to typically the IEEE 1394 standard, an information-reporting method for informing the user of information on a content to be output by the information-outputting apparatus and an information-signal-supply-route-selecting method in the network.

In recent years, a variety of digital contents are abundantly provided by way of communication media such as broadcasting media and the Internet as well as through recording media such as a DVD (digital video disc). It is conceivably possible to widen the range of applications of such abundantly available digital contents and to well provide an environment of utilizing digital contents wherein the user has a high degree of freedom to use the contents.

It is also conceivably possible to provide a digital interface to each of a variety of digital apparatuses such as digital-content playback and recording apparatuses. By providing a digital interface to each of a variety of digital apparatuses as such, a digital content can be transmitted at a high speed and copied as well as played back without degrading the quality.

While there are a variety of digital interfaces, a digital interface conforming to the IEEE 1394 standard draws much attention. The IEEE 1394 digital interface is capable of transmitting a digital content at a high speed and protecting a copyright of a digital content with a high degree of reliability. To be more specific, the digital interface conforming to the IEEE 1394 standard is capable of transmitting signals such as digital video and audio signals, which must satisfy real-time requirements.

In addition, in a communication through a digital interface conforming to the IEEE 1394 standard between an electronic apparatus serving of a source of a digital content and an electronic apparatus serving as a recipient of the digital content, by adding information on copy control to the digital content, the apparatus transmitting the digital content is capable of determining whether or not to give the recipient apparatus a right to copy the digital content.

The electronic apparatus serving of a source of a digital content encrypts the digital content to be transmitted. If the electronic apparatus serving as a recipient of a digital content is treated as an apparatus not allowed to copy the digital content by adding information on copy control to the digital content, the recipient apparatus is not informed of an encryption key information for decrypting the encrypted digital content so that a copyright of the digital content can be protected with a high degree of reliability.

By the way, digital television broadcasting presenting digital contents through broadcasting media is already under way. It is thus conceivably possible to provide a digital monitor apparatus or a digital television receiver that has a function for receiving a digital television broadcast. In the digital television broadcasting, digital data is typically data comprising a plurality of broadcasted programs. Prior to broadcasting, the data is subjected to compression adopting an MPEG method and multiplexing. Thus, the digital monitor apparatus must have an MPEG decoder.

By providing a digital interface to a digital monitor apparatus having an MPEG decoder, a digital content completing an encoding process adopting the MPEG method can be supplied to the apparatus as it is. The digital monitor apparatus is capable of decoding and playing back the digital content. Thus, a digital interface provided to a digital monitor apparatus is conceivable.

By merely providing a digital monitor apparatus with a digital interface, however, a problem arises in some cases. That is to say, while a digital monitor apparatus having a digital interface can be connected to a digital VTR, a hard-disc drive and the so-called camcoder, which is equipment comprising a video camera and a VTR built into a single body, a video signal stored in a recording medium such as a video tape by a digital VTR or a camcoder is in some cases a DV (Digital Video) signal obtained as a result of data compression based on a DV method instead of a signal encoded by adopting the MPEG method.

The DV method is a home digital VTR standard set by an HD Digital Conference, which was established by such as manufacturers of digital equipment as promoters. In accordance with the DV method, a DV signal is obtained as a result of compressing data of a video signal in frame units. That is to say, a DV signal consists of only I (Intra) picture components in the so-called MPEG method. An I picture is a picture obtained as a result of a intra-frame encoding process.

Thus, a digital monitor apparatus having only an MPEG decoder is not capable of decoding and playing back a DV signal supplied thereto by a digital VTR or the so-called camcoder by way of the digital interface.

Assuming that a digital monitor apparatus 1 having an analog input terminal in addition to an MPEG decoder and a digital interface is connected to a DV storage 2 of typically a digital VTR, an MPEG-TS (Transport Stream) storage 3 of typically a hard disc and a DV camcoder 4 as shown in FIG. 1.

In FIG. 1, solid lines 5, 6 and 7 each represent a digital signal cable whereas dashed lines 8, 9 and 10 each represent an analog signal cable. That is to say, the digital monitor apparatus 1 is connected to the DV storage 2, the MPEG-TS storage 3 and the DV camcoder 4 by the analog signal cables 8, 9 and 10 respectively and to the DV storage 2 by the digital signal cable 5, whereas the DV storage 2 is connected by the digital signal cable 6 to the MPEG-TS storage 3 which is connected to the DV camcoder 4 by the digital signal cable 7 to form a network.

It should be noted that the MPEG-TS storage 3 is an apparatus used for, among others, storing and playing back an MPEG-TS signal, which is obtained as a result of a process of multiplexing digital contents each resulting from data compression adopting the MPEG method.

A content decoded by the DV storage 2, the MPEG-TS storage 3 or the DV camcoder 4 into an analog signal is supplied to the digital monitor apparatus 1 through the analog signal cable 8, 9 or 10 respectively. In this case, the video of the content is displayed on a screen G of the digital monitor apparatus 1 as shown in FIG. 2A and the sound of the content is output by speakers SP1 and SP2 as is the case with the conventional apparatus.

By the same token, an MPEG-TS signal can be supplied from the MPEG-TS storage 3 to the digital monitor apparatus 1 through the digital signal cables 6 and 5 as it is. In this case, since the digital monitor apparatus 1 has an MPEG decoder, the monitor apparatus 1 is capable of displaying the video of the digital content on the screen G thereof as shown in FIG. 2A and outputting the sound of the content through the speakers SP1 and SP2.

By the same token, a DV signal can be supplied to the digital monitor apparatus 1 from the DV storage 2 through the digital signal cable 5 or from the DV camcoder 4 through the digital signal cables 7, 6 and 5 as it is. In this case, however, since the digital monitor apparatus 1 does not have a DV decoder, the monitor apparatus 1 is not capable of playing back the DV signal. As a result, as a conceivable method, the digital monitor apparatus 1 is put in a mute state as typically shown in FIG. 2B to prevent the video and the sound of the digital content from being output as noises.

With such a method, however, the user is not capable of immediately knowing why the content the user is trying to watch and listen to is not played back. In addition, in the case of a network comprising a plurality of electronic apparatuses connected to each other as shown in FIG. 1, the user of the digital monitor apparatus 1 is not capable of recognizing which route is used for supplying a content to the monitor apparatus 1 from an external apparatus connected to the monitor apparatus 1 by the network.

In the case of the network shown in FIG. 1, for example, as described above, the digital monitor apparatus 1 serving as the core apparatus may receive 3 different kinds of contents, namely:

(1) a decodable and reproducible digital content;
(2) an undecodable digital content; and
(3) a content supplied as an analog signal.

If an undecodable digital content is inadvertently supplied to the digital monitor apparatus 1, there may be raised a problem that the undecodable digital content is interpreted incorrectly as a failure occurring in the monitor apparatus 1 or the apparatus generating the content. In addition, since a content may be supplied to the digital monitor apparatus 1 from the same electronic apparatus through an analog signal cable or a digital signal cable, it is difficult to handle contents in the information reporting and outputting system in some cases. Thus, the environment for utilizing a digital content cannot be said to be sufficiently well provided yet.

SUMMARY OF THE INVENTION

The present invention presents an information-outputting apparatus, an information-reporting method and an information-signal-supply-route-selecting method, which provide a digital-content utilization environment giving the user a high degree of freedom to make use of the apparatus and the methods.

The information-outputting apparatus provided by the present invention is an apparatus connected to a network comprising a plurality of electronic apparatuses connected to each other by digital buses. The information-outputting apparatus comprises: a digital interface unit for receiving a digital signal transmitted through one of the digital buses; information-detecting means for detecting source-apparatus information indicating an electronic apparatus serving as a source outputting the digital signal and information on a format of the digital signal from the digital signal, which is received through the digital interface unit; and information-reporting means for reporting the source-apparatus information and the information on the format, which are detected by the information-detecting means.

In the information-outputting apparatus described above, source-apparatus information and information on a format, which are transmitted through a digital bus along with a main digital signal, are detected by the information-detecting means and reported by the information-reporting means.

It is thus possible for the user to know which electronic apparatus connected to a digital bus has supplied a digital signal and what format the digital signal has.

In addition, the information-outputting apparatus further has information-tabularizing means for organizing source-apparatus information and information on a format, which are detected by the information-detecting means, for each of the electronic apparatuses connected to the network in a table by associating the pair of source-apparatus information and information on a format with the corresponding electronic apparatus, whereas the information-reporting means reports the information tabularized by the information-tabularizing means to the user.

In the information-outputting apparatus, the information-detecting means detects a source-apparatus number and information on a format for each of the electronic apparatuses connected to the network. Then, the information-tabularizing means organizes the detected pieces of information into a table by associating them with the corresponding electronic apparatus. Finally, the information-reporting means reports some or all of the information tabularized by the information-tabularizing means.

It is thus possible for the information-outputting apparatus to inform the user of the information-outputting apparatus of source-apparatus information and information on a format, which are each received as an information signal along with a main digital signal, and information on connections of the other electronic apparatuses connected to the network.

Furthermore, the information-outputting apparatus described above has: one or more base-band-signal input terminals each connected to one of the electronic apparatuses connected to the network and each used for receiving a base-band signal generated by the electronic apparatus; and information-adding means for adding source-apparatus information indicating a source apparatus generating a base-band signal and information, which indicates the format of the base-band signal in case the base-band signal has been encoded, for each of the electronic apparatuses connected to the base-band-signal input terminals to the information tabularized by the information-tabularizing means by associating the source-apparatus information with the information indicating the format.

Moreover, the information-outputting apparatus has one or more base-band-signal input terminals each connected to an electronic apparatus and used for receiving a base-band signal generated by the electronic apparatus, and a source-apparatus number of a base-band signal received through each of the base-band-signal input terminals and information, which indicates the format of the base-band signal in case the base-band signal has been encoded, are added to the information tabularized by the information-tabularizing means.

It is thereby possible for the information-outputting apparatus to report information on base-band signals each received through a base-band-signal input terminal through the tabularized information as a table. Thus, the information-outputting apparatus is capable of controlling both the connection environment of digital signals and the connection environment of base-band signals.

In addition, the information-outputting apparatus described above also has apparatus-pointing means for pointing out a source apparatus generating a signal presently displayed on a screen in the tabularized information.

The information-outputting apparatus having such apparatus-pointing means allows the user to recognize a source apparatus generating a signal received by the information-outputting apparatus and presently displayed on a screen in the tabularized information. It is thus possible to report an electronic apparatus serving as a source generating a signal presently displayed on a screen and other electronic apparatuses in the network with ease and with a high degree of reliability.

The information-outputting apparatus described above further has: signal-decoding means for decoding a digital signal having a predetermined format among digital signals received by the digital interface unit; and decodable/undecodable judgment means for forming a judgment as to whether or not a digital signal received by the digital interface unit can be decoded by the signal-decoding means, wherein the information-reporting means reports the fact that a digital signal received by the digital interface unit is undecodable to the user in case an outcome of a judgment formed by the decodable/undecodable judgment means indicates that the digital signal is undecodable.

In the information-outputting apparatus described above, the information-reporting means reports the fact that a digital signal received by the digital interface unit is undecodable in case an outcome of a judgment formed by the decodable/undecodable judgment means indicates that the digital signal is undecodable.

Thus, the user of the information-outputting apparatus is capable of knowing which electronic apparatus connected to a digital bus outputs an undecodable and, hence, normally irreproducible main digital signal, as well as a format the digital signal has. Thus, when an undecodable and, hence, normally irreproducible main digital signal is supplied to the information-outputting apparatus, the user of the information-outputting apparatus will not incorrectly interpret the abnormal playback state as a failure occurring in the information-outputting apparatus. In addition, the user is allowed to carry out a manual operation to transfer the transmission route of the information signal so as to supply the main digital signal to another electronic apparatus that is capable of decoding the signal.

The decodable/undecodable judgment means employed in the information-outputting apparatus provided by the present invention forms a judgment as to whether a digital signal received by the digital interface unit is decodable or undecodable on the basis of the information on a format detected by the information-detecting means.

In the information-outputting apparatus described above, information on a format detected by the information-detecting means is used by the decodable/undecodable judgment means as a basis for forming a judgment as to whether a digital signal received by the digital interface unit is decodable or undecodable. Thus, the information-outputting apparatus is capable of forming a judgment quickly as to whether a digital signal received by the digital interface unit is decodable or undecodable without the need to make an attempt to decode the signal.

In the information-outputting apparatus, the information-reporting means reports information to the user by displaying the information on a display unit.

To be more specific, the information-reporting means displays information on source apparatuses, information on formats and the like on the display unit. It is thus possible to notify the user of the information-outputting apparatus of the information on source apparatuses, the information on formats and the like with a high degree of reliability.

In the information-outputting apparatus provided by the present invention, the information-reporting means outputs information as a sound or a voice generated by speakers.

To be more specific, the information-reporting means outputs information on source apparatuses, information on formats and the like as a sound or a voice generated by the speakers. It is thus possible to notify the user of the information-outputting apparatus of information on source apparatuses, information on formats and the like as audio information with a high degree of reliability.

In the information-outputting apparatus provided by the present invention, the information-reporting means reports information to the user by displaying the information on a display unit, and outputs information as a sound or a voice generated by the speakers.

By reporting information on source apparatuses, information on formats and the like as information displayed on a display unit, and outputting information on source apparatuses, information on formats and the like as a sound or a voice generated by the speakers, the information-outputting apparatus is capable of reporting the information on source apparatuses, the information on formats and the like with a high degree of reliability.

The information-outputting apparatus provided by the present invention further has encrypted/unencrypted judgment means for forming a judgment as to whether or not a digital signal received by the digital interface unit has been encrypted, and the information-reporting means reports a result of judgment output by the encrypted/unencrypted judgment means to the user.

In the information-outputting apparatus described above, the encrypted/unencrypted judgment means forms a judgment as to whether or not a digital signal received by the digital interface unit has been encrypted, and the information-reporting means reports a result of judgment output by the encrypted/unencrypted judgment means. Thus, when an encrypted main digital signal supplied to the information-outputting apparatus cannot be decrypted and, hence, cannot be played back normally, the user of the information-outputting apparatus will know that the main digital signal cannot be played back normally because the digital signal was encrypted so that the user will not incorrectly interpret the abnormal playback state as a failure occurring in the information-outputting apparatus.

As an implementation, in the information-outputting apparatus provided by the present invention, the information-detecting means is also capable of detecting information indicating whether or not a digital signal received by the digital interface unit has been encrypted from the digital signal; and in this case, the encrypted/unencrypted judgment means forms a judgment as to whether or not a digital signal received by the digital interface unit has been encrypted on the basis of the information detected by the information-detecting means to indicate whether or not the digital signal received by the digital interface unit has been encrypted.

As described above, in the information-outputting apparatus provided by the present invention, the information-detecting means detects information indicating whether or not a digital signal received by the digital interface unit has been encrypted from the digital signal; and the encrypted/unencrypted judgment means forms a judgment as to whether or not a digital signal received by the digital interface unit has been encrypted on the basis of the information detected by the information-detecting means to indicate whether or not the digital signal received by the digital interface unit has been encrypted.

As a result, the information-outputting apparatus is capable of determining whether or not a digital signal has been encrypted with a high degree of reliability without the need to carry out an operation such as to make an attempt to decrypt the digital signal.

In addition, the information-outputting apparatus provided by the present invention allows an electronic apparatus connected to the network to make an arbitrary access to the tabularized information.

As described above, another electronic apparatus connected to the network is capable of making an arbitrary access to the tabularized information in the information-outputting apparatus. Thus, another electronic apparatus connected to the network is capable of making use of the tabularized information in the information-outputting apparatus without the need to tabularize source information IDs and information on formats into a table in the other electronic apparatus itself.

In addition, another information-outputting apparatus provided by the present invention is also an apparatus connected to a network comprising a plurality of electronic apparatuses connected to each other by digital buses. The information-outputting apparatus comprises: one or more base-band-signal input terminals each connected to an electronic apparatus and used for receiving a base-band signal generated by the electronic apparatus; a digital interface unit for receiving a digital signal transmitted through one of the digital buses; decodable/undecodable judgment means for forming a judgment as to whether or not a digital signal received by the digital interface unit can be decoded by the information-outputting apparatus; and input-signal-switching means for switching a signal input so as to receive a base-band signal from one of the base-band-signal input terminals when an outcome of a judgment formed by the decodable/undecodable judgment means indicates that a digital signal received by the digital interface unit cannot be decoded by the information-outputting apparatus.

As described above, in the information-outputting apparatus, the input-signal-switching means switches the signal input so as to receive a base-band signal from one of the base-band-signal input terminals when an outcome of a judgment formed by the decodable/undecodable judgment means indicates that a main digital signal received by the digital interface unit cannot be decoded by the information-outputting apparatus.

Thus, when a main digital signal received by the digital interface unit cannot be decoded by the information-outputting-apparatus, the signal input can be switched automatically to receive a signal already decoded by another electronic apparatus connected to the same network from the other electronic apparatus without the need for the user to carry out a manual operation.

In addition, the information-outputting apparatus provided by the present invention further has command issuing means for issuing a command to an electronic apparatus, which is connected to the network and capable of decoding a digital signal, to decode the digital signal and output the decoded digital signal as a base-band signal in the case of an outcome of a judgment formed by the decodable/undecodable judgment means indicating that the same digital signal received by the digital interface unit cannot be decoded by the information-outputting apparatus.

As described above, the command issuing means employed in the information-outputting apparatus is capable of issuing a command to an electronic apparatus, which is connected to the network and capable of decoding a digital signal undecodable by the information-outputting apparatus, to decode the digital signal and output the decoded digital signal as a base-band signal. Thus, it is possible to decode a desired digital signal with a high degree of reliability and to use the decoded signal without the need for the user to carry out a manual operation.

The digital buses employed in the information-outputting apparatus provided by the present invention are each a bus conforming to the IEEE 1394 standard.

As described above, the information-outputting apparatus employs buses each conforming to the IEEE 1394 standard as the digital buses. Thus, digital information signals required to satisfy a real-time condition such as digital video and audio signals can be transmitted at a high speed and the copyright of the digital information signals can be protected reliably and properly.

As described above, in accordance with the present invention, when digital data of a content undecodable by the information-outputting apparatus is supplied to the information-outputting apparatus, information on the content can be reported to the user or another apparatus external to the information-outputting apparatus. It is thus possible to solve a problem of the user's misinterpreting a normally irreproducible digital data due to an inability to decode the digital data as a failure occurring in an electronic apparatus in use.

In a network comprising a plurality of electronic apparatuses connected to each other by digital buses, information on digital data generated by each of the electronic apparatuses connected to the network can be tabularized into a content information table. In addition, connection status of the network comprising a plurality of electronic apparatuses connected to each other by digital buses can be reported to the user and the electronic apparatuses connected to the network.

The user can thus make use of the content information table provided by the information-outputting apparatus as a basis for selecting an optimum supply route of an electronic apparatus considered to be a source of desired digital data. It is therefore possible to improve convenience provided to the user in utilization of the network.

In addition, when digital data that cannot be decoded by the information-outputting apparatus connected to a network comprising a plurality of electronic apparatuses connected to each other by digital buses is supplied to the information-outputting apparatus, the digital data is rerouted to an electronic apparatus capable of decoding the data before re-supplying the decoded digital data to the information-outputting apparatus as a base-band signal. As a result, by rerouting undecodable digital data directly supplied to the information-outputting apparatus to an electronic apparatus capable of decoding the undecodable digital data, the digital data can be used.

Moreover, by using digital buses, it is also possible to construct a network covering all electronic apparatuses and providing the user with convenience and a high degree of freedom to use.

BRIEF DESCRIPTION OF THE DRAWINGS

FIG. 2A is an explanatory diagram showing a typical display of a decodable digital content;

FIG. 2B is an explanatory diagram showing a state of a video display of an undecodable digital content;

FIG. 3 is an explanatory block diagram showing a monitor receiver applying an information-outputting apparatus implemented by an embodiment of the present invention;

FIG. 4A is an explanatory block diagram used for describing an asynchronous communication method adopted in a digital interface conforming to the IEEE 1394 standard;

FIG. 4B is an explanatory block diagram used for describing an isochronous communication method adopted in a digital interface conforming to the IEEE 1394 standard;

FIG. 7 is an explanatory diagram showing a typical content information table created in a monitor apparatus provided by the embodiment of the present invention;

FIG. 12 shows a continuation flowchart of the flowchart shown in FIG. 11.

DETAILED DESCRIPTION OF THE PREFERRED EMBODIMENTS

The following description explains a preferred embodiment implementing an information-outputting apparatus, an information-reporting method and an information-signal-supply-route-selecting method provided by the present invention by referring to the accompanying diagrams. The following embodiment is used to exemplify a case in which an information-outputting apparatus provided by the present invention is applied to a digital monitor apparatus. It should be noted that, in the following description of the embodiment, an audio system employed in the digital monitor apparatus is not explained in order to make the description simple.

Digital Monitor Apparatus

FIG. 3 is an explanatory block diagram showing a digital monitor apparatus 1 implemented by an embodiment of the present invention. In the following description, the digital monitor apparatus 1 is also referred to simply as monitor apparatus 1. As will be described later, the monitor apparatus 1 implemented by the embodiment has a function to receive a digital television broadcast and a digital interface circuit conforming to the IEEE 1394 standard as a digital interface.

Figure 1:
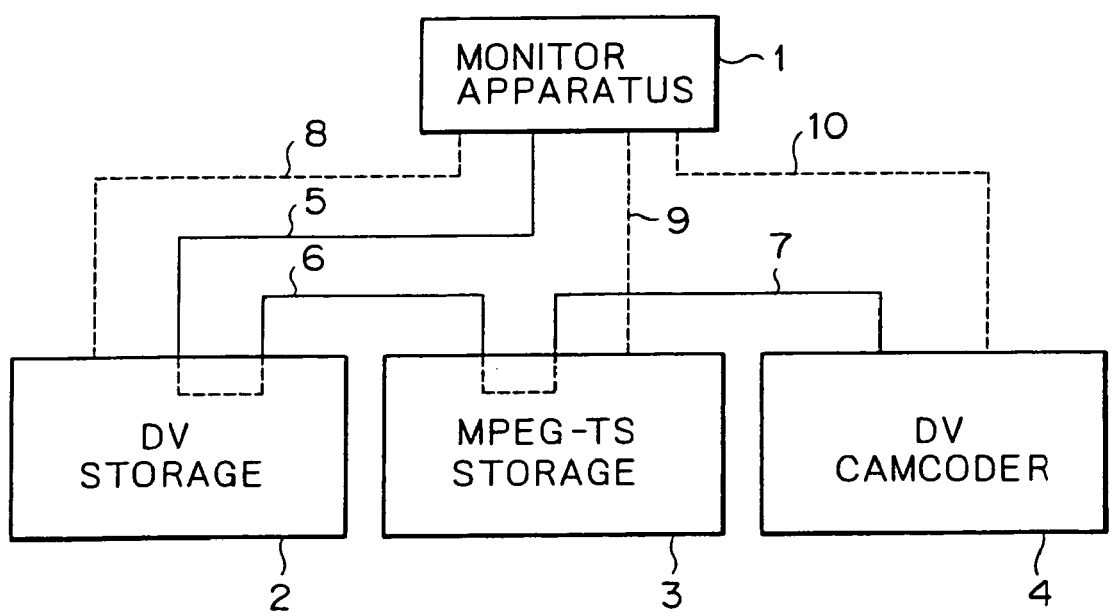
FIG. 1 is an explanatory block diagram showing connections between external apparatuses and a monitor apparatus having a digital interface and an analog interface (or analog I/O terminal)

This embodiment is used to exemplify a case wherein the monitor apparatus 1 is connected to a DV storage 2, an MPEG-TS (Transport Stream) storage 3 and a DV camcoder 4 by digital buses each conforming to the IEEE 1394 standard and analog transmission lines to form a network as shown in FIG. 1. The digital buses conforming to the IEEE 1394 standard are each referred to simply as a digital bus. The present invention is thus explained by referring also to FIG. 1 as follows.

Configuration and Operation of Digital Monitor Apparatus

As shown in FIG. 3, the monitor apparatus 1 implemented by the embodiment comprises an antenna 11, a tuner 12, a front-end unit 13, a demultiplexer 16, an MPEG decoder 17, a superposition circuit 19, a display circuit 20, a digital interface circuit 14 conforming to the IEEE 1394 standard, a switch circuit 15, an OSD-generating circuit 18 and 3 analog input terminals S1, S2 and S3. The digital interface circuit 14 conforming to the IEEE 1394 standard is referred to hereafter as an IEEE 1394 I/F circuit. There is also provided a control unit 30 for controlling the components of the monitor apparatus 1 implemented by the embodiment.

In the configuration shown in FIG. 3, the control unit 30 is a microcomputer comprising a CPU 21, a ROM 22 and a RAM 23, which are connected to each other by a CPU bus 24. The CPU 21 executes programs stored in the ROM 22. The RAM 23 serves as a work area used by the CPU 21 in carrying out various kinds of processing by execution of the programs. The control unit 30 also includes a key operation unit 25 operated by the user to enter an input.

The monitor apparatus 1 implemented by the embodiment has a reception display mode, a digital external input mode and an analog external input mode. In the reception display mode, a digital television broadcast signal is received, decoded with proper timing and then displayed. In the digital external input mode, a main digital signal received through the IEEE 1394 I/F circuit 14 is decoded and processed. In the analog external input mode, an analog signal received through the analog input terminal S1, S2 or S3 is processed.

The modes are switched from one to another in accordance with a mode select command input entered via the key operation unit 25 connected to the control unit 30 of the monitor apparatus 1.

As will described later, in the monitor apparatus 1 of the embodiment operating in the reception display mode, the control unit 30 executes control to drive the front-end unit 13 to demodulate a digital broadcast signal received by the tuner 12, the demultiplexer 16 to extract data of a program selected by the user and the MPEG decoder 17 to decode the data or output the data to the IEEE 1394 I/F circuit 14.

In the digital external input mode, the control unit 30 executes control to drive the demultiplexer 16 to extract data of a program selected by the user from a data stream received by the IEEE 1394 I/F circuit 14 and the MPEG decoder 17 to decode the data.

The reception display mode, the digital external input mode and the analog external input mode are each described as follows.

Reception Display Mode

The description begins with an explanation of operations, which are carried out in the monitor apparatus 1 when the reception display mode is selected. In this reception display mode, a broadcast signal D1 received by the antenna 11 is supplied to the tuner 12. The tuner 12 selects a desired digital broadcast signal D2 in accordance with a select control signal received from the control unit 30, supplying the selected digital broadcast signal D2 to the front-end unit 13.

The front-end unit 13 demodulates the signal D2 received from the tuner 12 and carries out error correction processing on a signal obtained as a result of the demodulation to generate a data stream D3. The data stream D3 is multiplexed data comprising a plurality of broadcast programs and an EPG (Electronic Program Guide).

The data stream D3 generated by the front-end unit 13 is supplied to an input terminal a of the switch circuit 15. With the reception display mode selected by the user, the switch circuit 15 is actuated by a control signal D9 generated by the control unit 30.

With the reception display mode selected by the user, the switch circuit 15 outputs a signal supplied to the input terminal a. Thus, the data stream D3 generated by the front-end unit 13 is supplied to the demultiplexer 16 by way of the switch circuit 15.

The demultiplexer 16 splits data demultiplexed in the data stream D3 into pieces of information such as broadcast programs and an EPG and rearranges them properly. The demultiplexer 16 extracts data of a broadcast program desired by the user in accordance with a select command signal output by the control unit 30, and supplies a video stream D4 comprising packets of a video signal portion of the extracted program to the MPEG decoder 17.

Since the video stream D4 supplied to the MPEG decoder 17 is data compressed by adopting the MPEG method, the MPEG decoder 17 decompresses the video stream D4 to recover video data D5 prior to the data compression. The MPEG decoder 17 then supplies the video data D5 to the superposition circuit 19. The superposition circuit 19 also receives display data called OSD (On Screen Display) data generated by the OSD-generating circuit 18.

The OSD data is superposed on video data of a picture in accordance with a control signal D10 generated by the control unit 30. Examples of the OSD data are a channel number, which is displayed when a channel is called by the user, a volume bar showing a volume level at volume adjustment and a variety of messages. The superposition circuit 19 superposes an OSD message on the video data D5 generated by the MPEG decoder 17 to form a video signal D6, which is then supplied to the display circuit 20.

The display circuit 20 generates a signal to be displayed on a display unit such as a CRT from the video signal D6 received from the superposition circuit 19. In this way, a video of a digital broadcast program extracted from a digital broadcast signal received by the antenna 11 and selected by the tuner 12 is displayed on the display unit of the monitor apparatus 1.

It should be noted that, in this embodiment, the demultiplexer 16 outputs a data stream supplied thereto to the IEEE 1394 I/F circuit 14 as a data stream (a content) D7. The IEEE 1394 I/F circuit 14 outputs the data stream D7 received from the demultiplexer 16 to the digital bus 5 by adopting an isochronous communication method to be described later so as to supply the data stream D7 to an electronic apparatus connected to the network other than the monitor apparatus 1 implemented by the embodiment.

An example of the other electronic device connected to the network is the MPEG-TS storage 3. Thus, the monitor apparatus 1 is capable of storing a digital broadcast signal received by the antenna 11 and selected by the tuner 12 in the MPEG-TS storage 3. It should be noted that, as described earlier, the data stream D7 is a multiplexed signal comprising pieces of data representing a plurality of broadcast programs compressed by adopting the MPEG method. Thus, the data stream D7 is a digital signal conforming to the so-called MPEG-TS standard.

Digital External Input Mode

Next, operations in the digital external input mode are explained. As described earlier by referring to FIG. 1, the monitor apparatus 1 implemented by the embodiment is connected to a plurality of electronic (external) apparatuses by the digital buses 5, 6 and 7. When digital signals are received from the electronic apparatuses by way of the connecting digital buses 5 to 7, the user of the monitor apparatus 1 selects an electronic apparatus from which a digital signal should be received by operating the key operation unit 25.

When the user operates the key operation unit 25, the control unit 30 executes control by supplying a control signal D11 to the IEEE 1394 I/F circuit 14 to select a transmission channel for transmitting a digital signal from the external apparatus selected by the user. At the same time, the control unit 30 supplies a control signal D9 to the switch circuit 15 to output a signal supplied to an input terminal b of the switch circuit 15.

As described earlier, the digital buses employed in this embodiment are each an IEEE 1394 bus, which is capable of transmitting digital data by adoption of 2 communication methods, namely, an asynchronous communication method and an isochronous communication method. In the isochronous communication method, transmission channels (isochronous channels) are assigned to a plurality of electronic apparatuses connected to the digital bus and video and audio data, which must satisfy real-time requirements, are transmitted, for example.

FIGS. 4A and 4B are explanatory diagrams used for explaining respectively the asynchronous and isochronous communication methods adopted in a digital interface conforming to the IEEE 1394 standard. To put it in detail, the diagrams are used for explaining a procedure (sub-action) for transmitting a packet.

To be more specific, FIG. 4A is an explanatory diagram used for describing the asynchronous communication method. In the case of the asynchronous communication method, data of a variable amount is transmitted and a response to the data is obtained from the recipient of the data. As shown in FIG. 4A, in the case of the asynchronous communication method, a sub-action is divided into 3 main portions, namely, Arb (an arbitration sequence), a packet (data packet transmission) and Ack (an acknowledgment).

On the other hand, FIG. 4B is an explanatory diagram used for describing the isochronous communication method. In the case of the isochronous communication method, data of a variable amount is transmitted to a simplified address at predetermined intervals. In the isochronous communication method, however, no response to the transmitted data is given.

As shown in FIG. 4B, in the case of the isochronous communication method, there are provided a plurality of isochronous channels, namely, a first channel, a second channel, a third channel and so on. A sub-action in each isochronous channel comprises an arbitration sequence (Arb) and a packet (data packet transmission).

The IEEE 1394 I/F circuit 14 selects an isochronous channel assigned to a desired external apparatus in order to receive a data stream transmitted by the desired external apparatus by adoption of the isochronous communication method in accordance with a control signal D11 output by the control unit 30. The IEEE 1394 I/F circuit 14 then receives the data stream transmitted through the isochronous channel.

Figure 5:
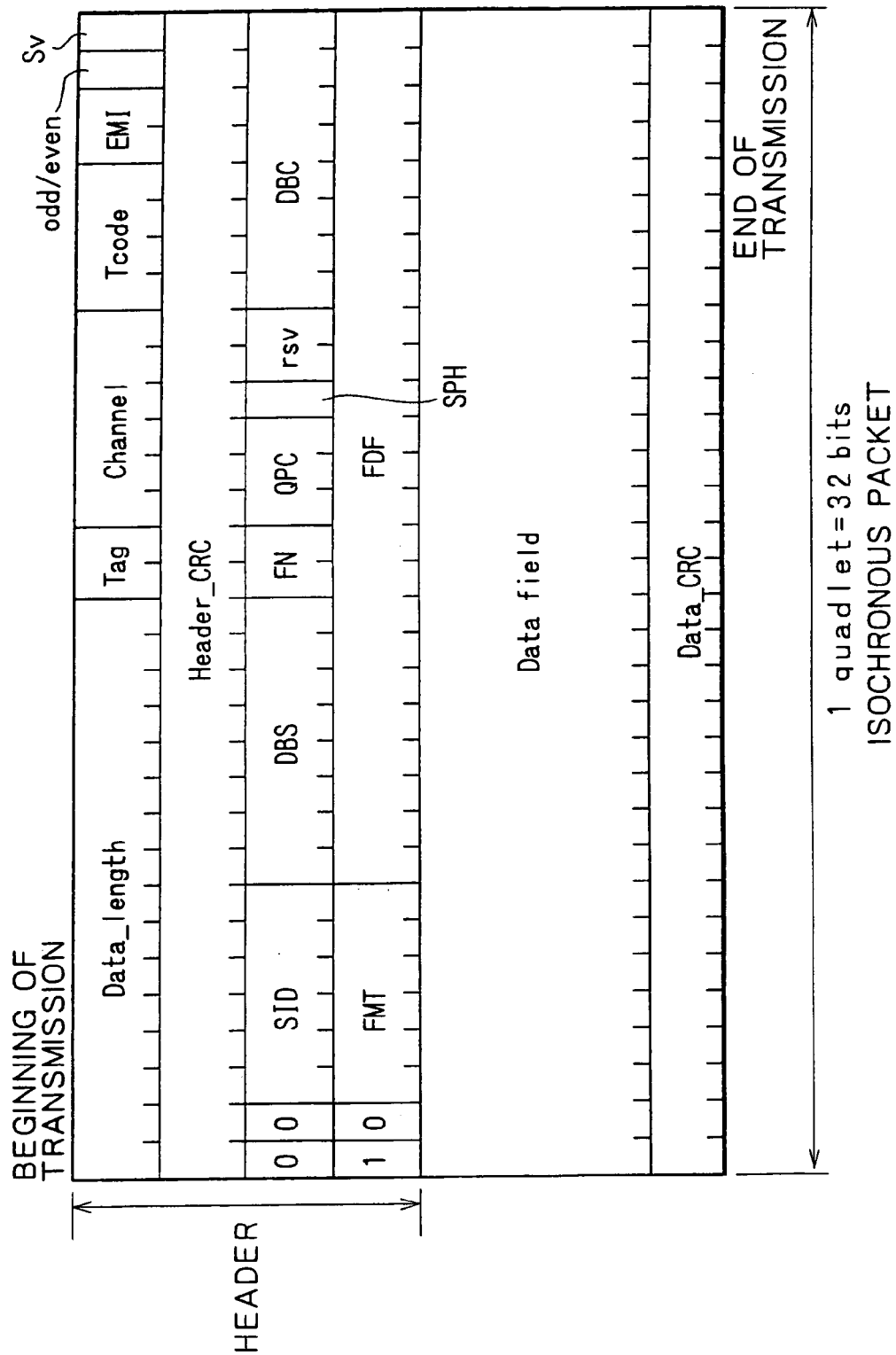
FIG. 5 is an explanatory diagram showing the format of an isochronous packet.

Selection of an isochronous channel can be based on information recorded in the header of a packet (isochronous packet) transmitted by adoption of the isochronous communication method. FIG. 5 is an explanatory diagram showing the format of an isochronous packet.

A channel field on the first line of the header shown in FIG. 5 is a field for recording an isochronous channel number. An SID (Source-apparatus ID) field on the third line of the header is a field for recording a node ID, which is information for identifying an external apparatus (or a source apparatus) serving as a source transmitting data as isochronous packets.

It should be noted the isochronous packet is described in detail in "IEEE 1394-1995: IEEE Standard for a High Performance Serial Bus" and "IEC61883: Consumer audio/video equipment."

In this embodiment, the IEEE 1394 I/F circuit 14 identifies the isochronous channel number from information recorded in the SID field of the header of an isochronous packet received from an external apparatus specified by the control unit 30. The IEEE 1394 I/F circuit 14 then receives the isochronous packet from an isochronous channel identified by the isochronous channel number.

In this way, the monitor apparatus 1 receives a data stream D8 transmitted by adoption of the isochronous communication method from an external apparatus desired by the user. Then, the data stream D8 received from the desired external apparatus is supplied to the input terminal b of the switch circuit 15.

In addition, the IEEE 1394 I/F circuit 14 is capable of supplying typically information extracted from received data to the control unit 30 as control data D12 by adoption of the asynchronous communication method. Furthermore, the IEEE 1394 I/F circuit 14 is capable of outputting typically control data received from the control unit 30 as a control signal D5 to the digital bus 5 by adoption of the asynchronous communication method to be supplied to an external apparatus connected to the same network.

As described above, when the monitor apparatus 1 implemented by the embodiment is set in the digital external input mode, the control signal D9 generated by the control unit 30 sets the switch circuit 15 to the input terminal b so that the data stream D8 output by the IEEE 1394 I/F circuit 14 is supplied to the demultiplexer 16 by way of the switch circuit 15.

Subsequent processing is the same as the reception display mode described earlier. That is to say, the demultiplexer 16 splits pieces of data multiplexed in the data stream D8 into programs and an EPG and rearranges the program and the EPG. The demultiplexer 16 then fetches data of a program desired by the user in accordance with a select command signal generated by the control unit 30 and supplies a video stream D4 comprising packets of the desired program to the MPE decoder 17.

The MPEG decoder 17 decompresses the video stream D4 received from the demultiplexer 16 by adopting the MPEG method to restore the video data D5 in a state prior to the data compression. The video data D5 is supplied to the superposition circuit 19. The superposition circuit 19 superposes display data (OSD data) generated by the OSD-generating circuit 18 on the video data D5 received from the MPEG decoder 17 to form a video signal D6, which is then supplied to the display circuit 20.

The display circuit 20 generates a signal to be displayed on a display unit such as a CRT from the video signal D6 received from the superposition circuit 19 and supplies the generated signal to the display unit. In this way, a video of a program extracted from a data stream transmitted by an external apparatus by way of the digital bus 5 is displayed on the display unit.

By the way, provided with the demultiplexer 16 and the MPEG decoder 17, the monitor apparatus 1 implemented by the embodiment is capable of decoding digital data conforming to the MPEG-TS method such as a digital television broadcast and playing back the decoded data. However, the monitor apparatus 1 is not capable of decoding digital data conforming to the DV method.

That is to say, in a network built as shown in FIG. 1, it is possible to decode and play back typically digital data with an MPEG-TS format transmitted through a digital bus from the MPEG-TS storage 3. However, it is impossible to decode and play back digital data with a DV format transmitted from the DV storage 2 or the DV camcoder 4 by way of a digital bus.

Thus, the monitor apparatus 1 implemented by the embodiment is not capable of displaying a video even if digital data is received from the DV storage 2 or the DV camcoder 4 since the digital data cannot be decoded. It is quite within the bounds of possibility that the user not familiar with these kinds of equipment incorrectly thinks that a failure occurs in the DV storage 2, the DV camcoder 4 or the monitor apparatus 1 in case no video is displayed.

In order to solve the problem described above, when digital data that cannot be decoded by the monitor apparatus 1 implemented by the embodiment is supplied to the monitor apparatus 1, the monitor apparatus 1 notifies the user of the isochronous channel number, the source information ID and the information on the format of the digital data by displaying the isochronous channel number, the source information ID and the information on the format on the display unit employed in the monitor apparatus 1.

The information on the format includes information indicating one of a variety of encoding methods including data compressing and encoding methods such as the DV method, the MPEG method and the JPEG method. The information on the format also includes information indicating transmission method parameters such as the number of bits per word determined for transmitting digital data, a header size, header items and a packet size. Thus, the information on a format is information that can be used for determining a cause of an inability to decode digital data due to a difference in encoding method or a difference in transmission method.

In the monitor apparatus 1 implemented by the embodiment, as described earlier, information on a format includes information indicating a compressing and encoding method adopted for digital data supplied to the monitor apparatus 1. The information indicating a compressing and encoding method in this embodiment is referred to hereafter as format information.

That is to say, in the case of an IEEE 1394 bus, as described earlier by referring to FIG. 5, the header of an isochronous packet includes an isochronous channel number in the channel field, a source apparatus ID in the SID field and format information in the FMT field indicating a compressing and encoding method adopted for compressing and encoding digital data transmitted by using the isochronous packet.

The IEEE 1394 I/F circuit 14 extracts a transmission channel number of the channel field, a source apparatus ID of the SID field and format information of the FMT field from the header of a selectively received isochronous packet, supplying the transmission channel number, the source apparatus ID and the format information to the control unit 30. The control unit 30 determines whether digital data to be processed has been compressed and encoded by adopting a compressing and encoding method that allows the monitor apparatus 1 to decompress and decode the digital data. The formation of the judgment is based on the format information extracted from the FMT field of the header of the isochronous packet of the digital data received by the monitor apparatus 1. If the digital data cannot be decompressed and decoded, that is, if the digital data has been encoded by adoption of the DV method in the case of this embodiment, the control unit 30 passes on the transmission channel number of the channel field, the source apparatus ID of the SID field and the format information of the FMT field received from the IEEE 1394 I/F circuit 14 to the OSD-generating unit 18.

The OSD-generating unit 18 generates OSD information showing the transmission channel number, the source apparatus ID and the format information from the transmission channel number of the channel field, the source apparatus ID of the SID field and the format information of the FMT field received from the control unit 30, supplying the OSD information to the superposition circuit 19.

Figure 6:
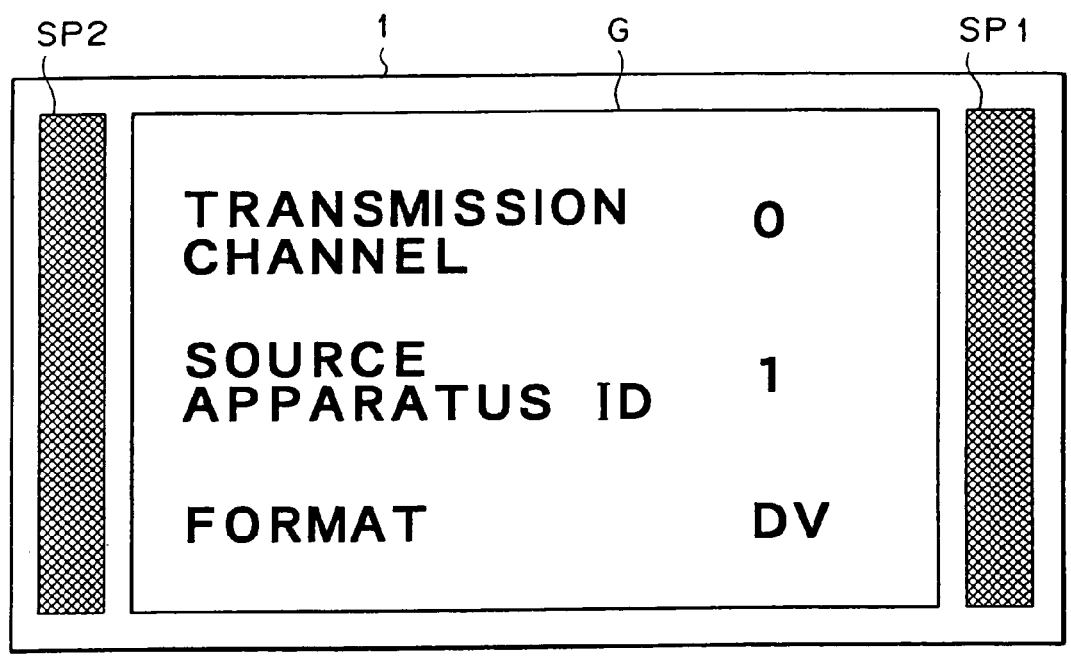
FIG. 6 is an explanatory diagram showing a typical display of information on a content.

Thus, when the user of the monitor apparatus 1 implemented by the embodiment prefers to receive digital data from the DV storage 2 or the DV camcoder 4 by way of one of the digital buses, the screen G of the display apparatus 1 displays a transmission channel or an isochronous channel number extracted from the channel field, a source apparatus ID extracted from the SID field and format information extracted from the FMT field as shown in FIG. 6.

FIG. 6 is an explanatory diagram showing a typical display of information on a packet, which appears on the display screen G of the monitor apparatus 1 implemented by the embodiment when the user of the monitor apparatus 1 prefers to receive digital data from, for example, the DV storage 2 in the network.

As described above, when the monitor apparatus 1 implemented by the embodiment receives digital data, which cannot be decoded by the monitor apparatus 1, the monitor apparatus 1 notifies the user of the monitor apparatus 1 of which isochronous channel is used for receiving the digital data, which external apparatus is supplying the digital data and which comprising and encoding method was adopted by the external apparatus to generate the digital data.

Thus, the user of the monitor apparatus 1 is capable of knowing that digital data received from its own selected external apparatus is digital data compressed and encoded by adopting a compressing and encoding method that makes it impossible for the monitor apparatus 1 to decompress and decode the digital data.

It should be noted that a user not familiar with the monitor apparatus 1 may not be capable of immediately understanding the reason why no video display appears on the screen by merely being informed of a transmission channel, a source apparatus ID and format information. In order to solve this problem, the monitor apparatus 1 may display a typical message of "Since digital data received from a DV storage identified by a source apparatus ID of 2 is data having a DV format, the digital data cannot be decoded by the monitor apparatus." or "Since digital data received from a DV storage identified by a source apparatus ID of 1 is data having an incompatible format, the digital data cannot be displayed by the monitor apparatus."

Such a message is stored in the ROM 22 employed in the control unit 30 in advance and, if format information received from the IEEE 1394 I/F circuit 14 indicates that a DV signal is received, the control unit 30 retrieves the message from the ROM 22 and supplies the message to the OSD-generating unit 18.

It should be noted that, in the description of the embodiment, an audio system employed in the monitor apparatus 1 implemented by the embodiment is not explained in order to make the description simple as described above. Thus, in addition to a displayed message, an audio message can also be output from the speakers SP1 and SP2 employed in the monitor apparatus 1. In this case, at a stage before the speakers SP1 and SP2, there is provided a message-generating circuit for generating an audio message according to control executed by the control unit 30 and supplying the message to the speakers SP1 and SP2. It is needless to say that an audio message can be output by adopting another method.

As described above, when digital data, which cannot be decoded and, hence, displayed, is supplied to the monitor apparatus 1, the monitor apparatus 1 informs the user of an isochronous channel number, a source apparatus ID and format information through typically a display, preventing the user from incorrectly misinterpreting the undisplayed digital data as a failure occurring in an apparatus.

In addition, reporting of an isochronous channel number, a source apparatus ID and format information typically as a display as described above allows a countermeasure to be taken to solve the problem by manually changing the transmission route of digital data, for example, by having the digital data rerouted to an external apparatus capable of decoding the digital data before supplying back the data to the monitor apparatus 1.

Moreover, the monitor apparatus 1 implemented by the embodiment uses format information extracted from the FMT field of the header of an isochronous packet as a basis for determining whether or not digital data received by the IEEE 1394 I/F circuit 14 is digital data having a format allowing the monitor apparatus 1 to decode the data. It should be noted, however, that the scope of the present invention is not limited to this scheme.

For example, digital data received by the IEEE 1394 I/F circuit 14 is decoded, and the decoded data is used as a basis for determining whether or not the digital data is digital data having a format allowing the monitor apparatus 1 to decode the data. That is to say, a variety of methods may be adopted for determining whether or not digital data received by the IEEE 1394 I/F circuit 14 is digital data having a format allowing the monitor apparatus 1 to decode the data.

By using format information extracted from the FMT field of the header of an isochronous packet as a basis for determining whether or not digital data received by the IEEE 1394 I/F circuit 14 is digital data having a format allowing the monitor apparatus 1 to decode the data, nevertheless, it becomes unnecessary to decode the digital data. Thus, it is possible to determine whether or not digital data received by the IEEE 1394 I/F circuit 14 is digital data having a format allowing the monitor apparatus 1 to decode the data in a short period of time.

Analog External Input Mode

Next, operations carried out in the analog external input mode are explained. As shown in FIG. 1, the DV storage 2, the MPEG-TS storage 3 and the DV camcoder 4 are connected to the monitor apparatus 1 implemented by the embodiment through the analog signal cables 8, 9 and 10 respectively. The user of the monitor apparatus 1 is allowed to operate the key operation unit 25 to select one of the DV storage 2, the MPEG-TS storage 3 and the DV camcoder 4 connected to the monitor apparatus 1 through the analog signal cables 8, 9 and 10 respectively as a source apparatus for generating an analog signal to be supplied to the monitor apparatus 1.

In this embodiment, the DV storage 2, the MPEG-TS storage 3 and the DV camcoder 4 are connected to the analog input terminals S1, S2 and S3 of the monitor apparatus 1 respectively. Analog signals received at the analog input terminals S1, S2 and S3 are supplied to the superposition circuit 19.

In this embodiment, the superposition circuit 19 is capable of selecting one of the analog signals received at the analog input terminals S1, S2 and S3 as a signal to be processed in accordance with control executed by the control unit 30. Then, the superposition circuit 19 superposes OSD information received from the OSD-generating circuit 18 on the selected analog signal, outputting the OSD information and the analog signal to the display circuit 20 as a video signal D6.

The display circuit 20 generates a signal to be displayed on a display unit such as a CRT from the video signal D6 received from the superposition circuit 19 and supplies the generated signal to the display unit. In this way, a video conveyed by an analog video signal received from an external apparatus by way of one of the analog signal cables 8, 9 and 10 is displayed on the display unit.

As described above, the monitor apparatus 1 implemented by the embodiment has 3 modes, namely, the reception display mode, the digital external input mode and the analog external input mode. Also as described above, when digital data that cannot be decoded by the monitor apparatus 1 is received in the digital external input mode, the isochronous channel number, the source apparatus ID and the format information are reported. Thus, when no video display appears on the screen because of reception of undecodable digital data, the user of the monitor apparatus 1 does not incorrectly interpret the screen with no video display as a failure occurring in an apparatus.

As described above, in this embodiment, an isochronous channel number, a source apparatus ID and format information are reported only when digital data that cannot be decoded by the monitor apparatus 1 is received. It should be noted, however, that the scope of the present invention is not limited to this scheme.

In the digital external input mode, for example, an isochronous channel number, a source apparatus ID and format information are reported without regard to whether or not digital data received from an external apparatus can be decoded by the apparatus and the reporting is ended after a predetermined period of time lapses or when the user enters an acknowledgement in response to the report.

In the above description, the superposition circuit 19 employed in the monitor apparatus 1 shown in FIG. 3 is explained as a circuit for superposing OSD information on a video signal. It should be noted, however, that the superposition circuit 19 is also capable of forming a picture to be displayed on a screen by synthesizing typically 4 different video signals, namely, a video signal generated by the MPEG decoder 17 and video signals input from the 3 analog input terminals S1, S2 and S3.

When forming a picture to be displayed on a screen by synthesizing a plurality of different video signals one of which cannot be displayed as described above, the monitor apparatus 1 displays an isochronous channel number, a source apparatus ID and format information in an area on the screen for a video portion of the undecodable signal or over the entire screen.

Creation of Content Information Table

By the way, as described earlier by referring to FIG. 6, when the monitor apparatus 1 operating in the digital external input mode receives digital data, which cannot be decoded thereby, the monitor apparatus 1 reports an isochronous channel number, a source apparatus ID and format information to the user so that the user does not incorrectly interpret the screen with no video display as a failure occurring in an apparatus.

As described above, however, a concrete countermeasure can be taken to solve the no-display problem by manually changing the transmission route of digital data, for example, by having the digital data rerouted to an external apparatus capable of decoding the digital data before supplying the data back to the monitor apparatus 1. In this case, nevertheless, the transmission route of the digital data cannot be changed quickly unless the user knows external apparatuses and types of digital data the external apparatuses are capable of decoding.

When an attempt is made to dub digital data generated by the DV storage 2 in a network with a plurality of external apparatuses connected thereto as shown in FIG. 1, for example, it is quite within the bounds of possibility that the user does not know which external apparatus is capable of dubbing the digital data.

In order to solve this problem, in this embodiment, information on contents or signals supplied to the monitor apparatus 1 is tabularized into a content information table, which is stored in a memory to be reported to the user through the monitor apparatus 1 or another external apparatus in order to offer more convenience to the user.

FIG. 7 is an explanatory diagram showing a typical content information table created in the monitor apparatus 1 by tabularizing information on contents or signals supplied to the monitor apparatus 1. A transmission channel number column, a transmission source ID column and a format column correspond to respectively the isochronous channel number field, the source apparatus ID (SID) field and the format information (FMT) field in the header of an isochronous packet described earlier by referring to FIG. 5.

Information on an encryption column indicates whether or not digital data has been encrypted. This information can also obtained from the header of an isochronous packet shown in FIG. 5. To be more specific, information in an EMI field in the header of an isochronous packet shown in FIG. 5 is a control code for encryption of the content and can thus be used to indicate whether or not the digital data has been encrypted. To put it in detail, the information in the EMI field indicates whether or not the digital data or the digital content transmitted by using this packet has been encrypted.

The IEEE 1394 I/F circuit 14 employed in the monitor apparatus 1 implemented by the embodiment changes the isochronous channel from one to another to scan for an isochronous packet that is receivable. Then, the IEEE 1394 I/F circuit 14 extracts necessary data from the header of a received isochronous packet. Finally, the extracted data is tabularized to form a content information table like the one shown in FIG. 7.

It should be noted that the control unit 30 employed in the monitor apparatus 1 recognizes which mode the monitor apparatus 1 is presently operating in and which external apparatus is currently supplying information to the monitor apparatus 1. A specifier denoted by a circle mark is appended on an active row representing an external apparatus currently supplying a signal conveying a content currently displayed as a picture on the monitor apparatus 1. The circle mark distinguishes the active row from the others. In the content information table shown in the figure, the active first row indicates that an external apparatus with a transmission source ID of 2 is currently supplying an unencrypted digital signal of the DV format.

In addition, the monitor apparatus 1 implemented by the embodiment is provided with the 3 analog input terminals S1, S2 and S3 each used for receiving an analog signal. The fact that an analog transmission line is connected to any of the 3 analog input terminals S1, S2 and S3 can be sensed by mechanical means or by detection of the impedance of the analog transmission line, the voltage level of the signal or the like.

Unlike a digital signal received by the IEEE 1394 I/F circuit 14 as described earlier, however, it is impossible to automatically detect information indicating which analog input terminal is currently receiving an analog signal or which external apparatus is presently supplying an analog signal and what analog signal is currently being supplied. In order to solve this problem, in this embodiment, the user of the monitor apparatus 1 enters information on analog signals supplied to the analog input terminals S1, S2 and S3 via the key operation unit 25.

At that time, the content information table shown in FIG. 7 is displayed on the screen G of the display unit employed in the monitor apparatus 1. On the lower part of the content information table, analog signal rows each representing an analog connection are created like digital signal rows each representing a digital connection. Much like the digital signal rows, each of the analog signal rows of the content information table shows information on the analog connection, which is entered by the user typically via the key operation unit 25.

In the case of the network wherein the DV storage 2, the MPEG-TS storage 3 and the DV camcoder 4 are connected to the digital monitor apparatus 1 as shown in FIG. 1, for example, information on digital data supplied to the IEEE 1394 I/F circuit 14, that is, information described on digital signal rows of the content information table shown in FIG. 7, can be automatically detected by scanning as described above.

Then, while looking at the information on digital data obtained by automatic detection and described on the digital signal rows of the content information table, the user sets analog connections each corresponding to one of the digital connections. That is to say, in the case of the network shown in FIG. 1, the analog outputs of the DV storage 2, the MPEG-TS storage 3 and the DV camcoder 4 are connected to the analog input terminals S1, S2 and S3 of the monitor apparatus 1 respectively.

The analog connections each corresponding to one of the digital connections are set by copying pieces of information described on the digital signal rows of the content information table to the analog signal rows as they are as shown in FIG. 7. In this way, pieces of information on analog signals supplied to the monitor apparatus 1 can be described on the analog signal rows of the content information table by merely copying information on digital data supplied to the IEEE 1394 I/F circuit 14 employed in the monitor apparatus 1, that is, information described on digital signal rows, which can be automatically detected by scanning as described above.

Information on an analog signal in the content information table shown in FIG. 7 includes a transmission channel number, a transmission source ID, a format and information on encryption. The transmission channel number is an analog transmission number assigned to the analog input terminal S1, S2 or S3 receiving this analog signal. The transmission source ID is a source apparatus ID (SID) assigned to a digitally connected external apparatus generating this analog signal. The format is the format information extracted from the FMT field of digital data representing a content output as this analog signal. The information on encryption is information in the EMI field of digital data representing a content output as this analog signal. As described earlier, the information in the EMI field indicates whether or not the digital data has been encrypted.

As described above, each analog connection can be associated with a digital connection, and the monitor apparatus 1 is capable of controlling analog and digital connections as a content information table like the one shown in FIG. 7.

Much like the information on the digital signals, the information on the analog signals can also be added automatically to the content information table shown in FIG. 7 if the information on the analog signals can be transmitted from the external apparatuses connected to the input terminals S1, S2 and S3 of the monitor apparatus 1 to the monitor apparatus 1 through the analog transmission lines connected to the input terminals S1, S2 and S3, by radio communication or through other transmission lines.

By utilizing the functions of the IEEE 1394 bus, the monitor apparatus 1 implemented by the embodiment is capable of supplying part or all of the content information table of FIG. 7 created in the monitor apparatus 1 to an external apparatus connected to the network at a request made by the external apparatus.

With such a capability of the monitor apparatus 1, each of the external apparatuses connected to the network shown in FIG. 1 is capable of knowing which of the external apparatuses is currently supplying data to the monitor apparatus 1 and what type of data is presently being supplied thereto. As described above, the monitor apparatus 1 itself is capable of determining whether or not the signal representing the data can be decoded by the monitor apparatus 1. In addition, the user of the network is capable of knowing connection status of the network from the content information table. For example, the user is capable of knowing which of the external apparatuses is capable of processing a signal, which is supplied by another external apparatus but cannot be processed by the monitor apparatus 1.

Figure 8:
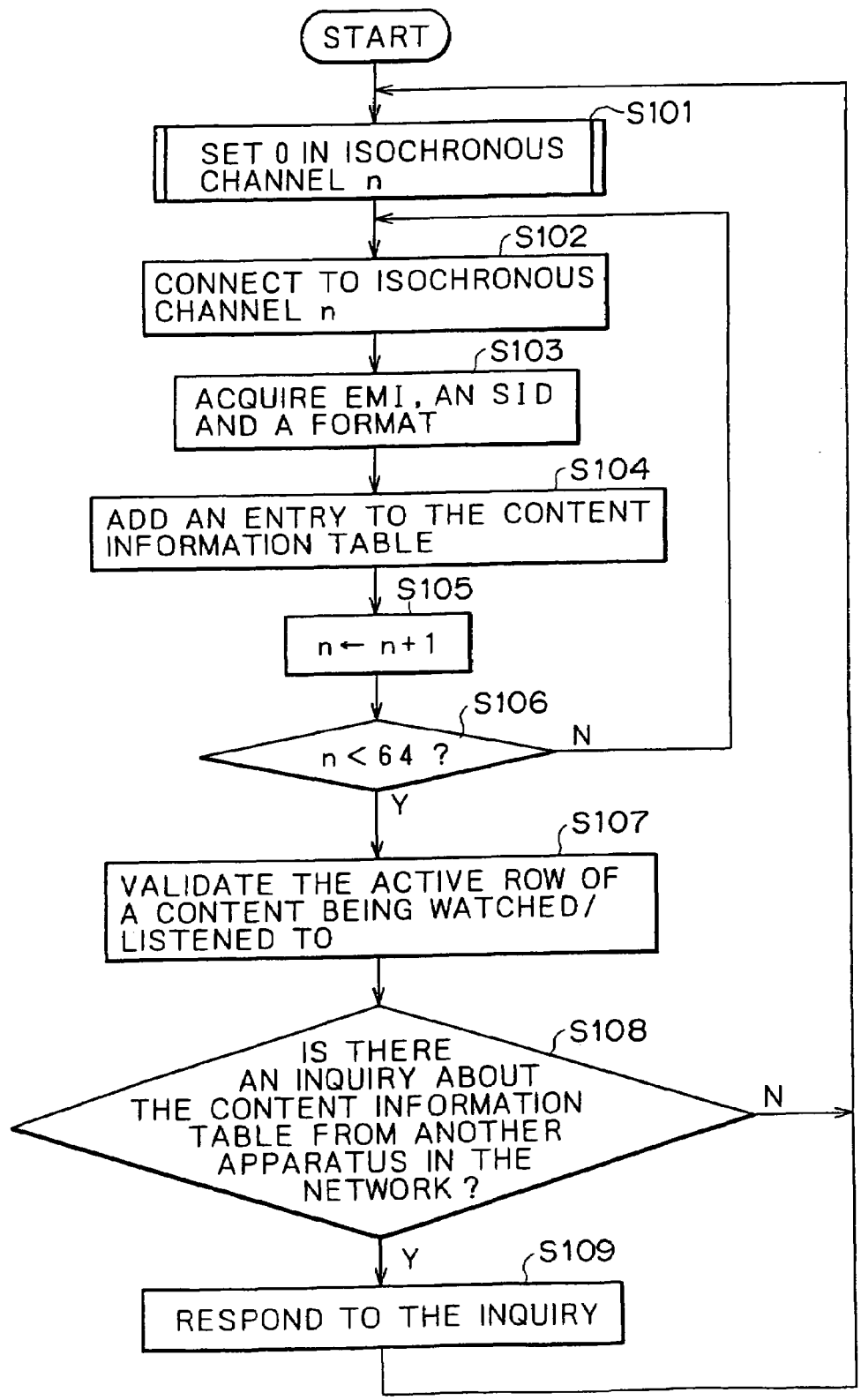
FIG. 8 shows an explanatory flowchart representing processing to create a content information table and processing to present a content information table according to a request received from an external apparatus.

The following description explains pieces of processing carried out by the monitor apparatus 1 implemented by the embodiment to create a content information table and to respond to an inquiry about the content information table by referring to a flowchart shown in FIG. 8.

When the control unit 30 employed in the monitor apparatus 1 of the embodiment enters a state of being capable of carrying out operations at the time the power supply of the monitor apparatus 1 is turned on, the processing represented by the flowchart shown in FIG. 8 is carried out. As shown in the figure, the flowchart begins with a step S101 at which the control unit 30 employed in the monitor apparatus 1 sets a variable n at 0. The variable n is the number of already scanned isochronous channels or already scanned transmission channels through which signals are received through the IEEE 1394 I/F circuit 14. Then, at the next step S102, the control unit 30 sets isochronous channel n in the IEEE 1394 I/F circuit 14 and connects the monitor apparatus 1 to isochronous channel n.

It is the CPU 21 that sets an isochronous channel in the IEEE 1394 I/F circuit 14 through the CPU bus 24. When an isochronous channel is set, the IEEE 1394 I/F circuit 14 selects isochronous data of the set isochronous channel received through an IEEE 1394 bus and extracts isochronous packets, that is, pieces of data packetized for the isochronous channel.

For the reason described above, the IEEE 1394 I/F circuit 14 employed in the embodiment is provided with a plurality of possible isochronous channels settings each used for receiving content information incoming through an IEEE 1394 bus by adoption of a polling method. That is to say, by sequentially changing the isochronous channel setting from one to another, the IEEE 1394 I/F circuit 14 is capable of selecting data received through a set isochronous channel and extracting isochronous packets, that is, pieces of data packetized for the isochronous channel, from the selected channel.

Then, at the next step S103, the IEEE 1394 I/F circuit 14 extracts information indicating whether or not the selected data has been encrypted, a source apparatus ID and format information respectively from the EMI, SID and FMT fields of the header of an extracted isochronous packet, which was explained earlier by referring to FIG. 5, supplying the information on encryption, the source apparatus ID and the format information to the control unit 30.

Subsequently, at the next step S104, the control unit 30 employed in the embodiment creates a content information table in the RAM 23. To put it in detail, the control unit 30 receives the information on data encryption, the source apparatus ID and the format information respectively extracted from the EMI, SID and FMT fields by the IEEE 1394 I/F circuit 14, putting the information on data encryption, the source apparatus ID and the format information in an entry of the content information table created in the RAM 23 along with an isochronous channel number or a transmission channel number associated with the entry. The isochronous channel number or the transmission channel number is determined by the variable n.

Then, at the next step S105, the control unit 30 increments the variable n by 1 in order to go to a next isochronous channel in a channel-scanning operation. Subsequently, at the next step S106, the variable n is examined to form a judgment as to whether the variable n has not exceeded a maximum value of the number of isochronous channels, which is 63 as prescribed in IEEE 1394-1995 specifications.

If the outcome of the judgment formed at the step S106 indicates that the variable n has not exceeded the maximum value of the number of isochronous channels, the flow of the processing goes on to a step S107 at which the active row of the content information table is made valid. The active row includes pieces of information for a content superposed in the superposition circuit 19 and currently being watched and listened to. The content superposed in the superposition circuit 19 and currently being watched and listened to is determined by the superposition circuit 19 in accordance with control executed by the control unit 30 and in accordance with a command entered by the user.

Then, at the next step S108, the control unit 30 forms a judgment as to whether or not an external apparatus connected to the network has made an inquiry about the content information table through the IEEE 1394 bus and the IEEE 1394 I/F circuit 14. The control unit 30 forms the judgment as to whether or not an external apparatus connected to the network has made an inquiry about the content information table on the basis of an isochronous communication from the external apparatus to the monitor apparatus 1 through a digital bus between the external apparatus to the monitor apparatus 1.

If the outcome of the judgment formed at the step S108 indicates that an external apparatus connected to the network has made an inquiry about the content information table, the flow of the processing goes on to a step S109 at which some or all of information in the content information table created in the RAM 23 is transmitted to the external apparatus making the inquiry though the IEEE 1394 I/F circuit 14 and the IEEE 1394 bus. Then, the flow of the processing goes back to the step S101 to repeat the processing from this step.

If the outcome of the judgment formed at the step S108 indicates that no external apparatus connected to the network has made an inquiry about the content information table, on the other hand, the flow of the processing goes back to the step S101 to repeat the pieces of processing.

A judgment as to whether some or all of information in the content information table is to be transmitted to the external apparatus making the inquiry is formed in accordance with the inquiry. If the outcome of the judgment indicates that only some of information in the content information table is to be transmitted, some of the information may be only information on the external apparatus making the inquiry or only information on external apparatuses other than the external apparatus making the inquiry.

As an alternative, all of the information in the content information table is always transmitted to the external apparatus making the inquiry and, at the recipient external apparatus, the information is further processed to produce a final output.

As described above, content information transmitted by adoption of an isochronous communication method through IEEE 1394 buses is scanned by sequentially changing the isochronous channel from one to another to monitor digital data handled through the isochronous channels and acquire information on the digital data without the need for the user to carry out a manual operation.

On the other hand, information on a content supplied as an analog signal to the monitor apparatus 1 by an external apparatus connected to the monitor apparatus 1 by an analog signal cable is acquired and set manually by the user. In this way, a content information table including both information on analog contents and information on digital contents is created and stored in the monitor apparatus 1 to be presented to the user of the monitor apparatus 1 or an external apparatus connected to the network.

In addition, by displaying the content information table created in the apparatus on the screen of the display unit employed in the monitor apparatus 1 as shown in FIG. 7, it is possible to inform the user of the monitor apparatus 1 of connection status of the network to which the monitor apparatus 1 is connected.

Figure 9:
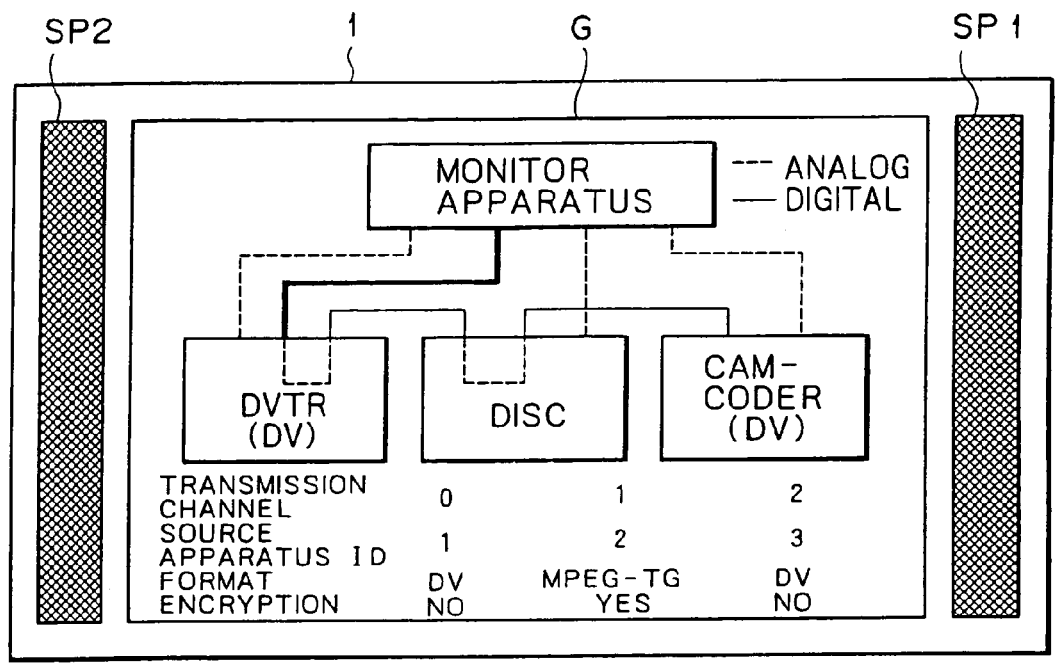
FIG. 9 is an explanatory diagram showing a typical display of information on a content.

It is also possible to draw connection status of the network connecting the monitor apparatus 1 to other external apparatuses based on the content information table on the screen as shown in FIG. 9. In order to display the entire content information table shown in FIG. 7 or to draw the connection status of the network shown in FIG. 9 as described above, the control unit 30 supplies display information to the OSD-generating circuit 18.

In the connection status of the network drawn on the screen, a transmission line currently being used is typically represented by a thick line as shown in FIG. 9 so as to enable the user to distinguish such a line from others. As an alternative, the color or the brightness of such a transmission line is made different from those of the others. As another alternative, such a transmission line is displayed in a blinking state. In this way, the user is capable of recognizing which external apparatus is currently supplying a signal to the monitor apparatus 1 at a glance.

When an incorrect selection is made so that undecodable digital data is inadvertently received as indicated by a displayed screen shown in FIG. 6 in a process to create a content information table, information on the digital data can be displayed on the display screen G of the display unit employed in the monitor apparatus 1. It is needless to say that, even if decodable digital data is selected, information on the digital data can also be displayed on the display screen G of the display unit employed in the monitor apparatus 1, being superposed on a video display of the digital data.

Figure 10:
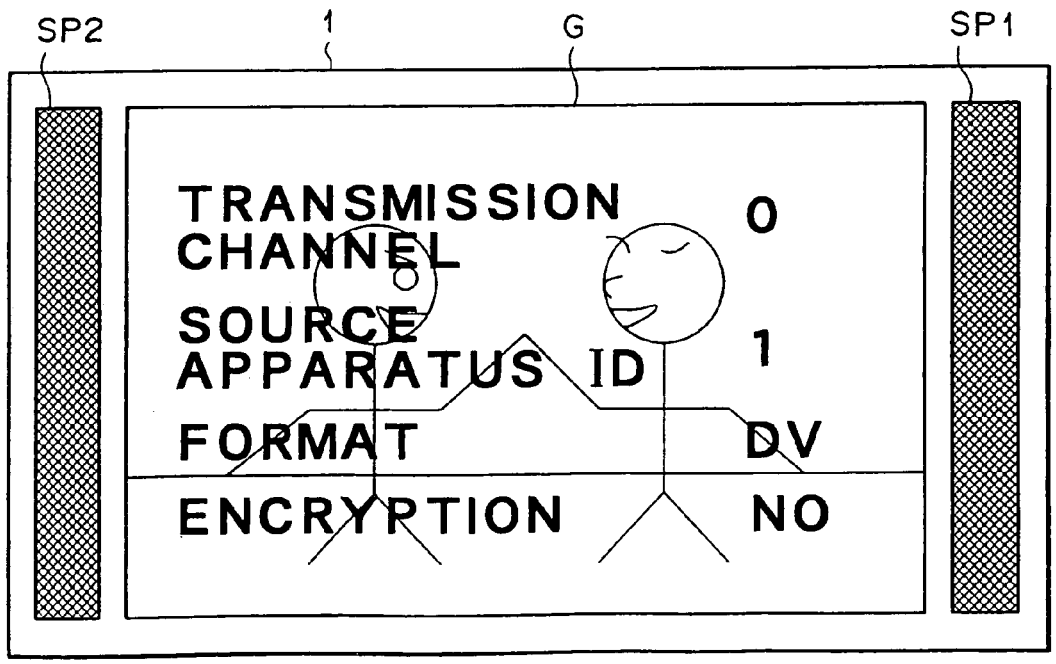
FIG. 10 is an explanatory diagram showing a typical display of information according to the content information table.

As described above, in this embodiment, if it is obvious that a relation between external apparatuses connected to the monitor apparatus 1 by analog signal cables and the analog terminals S1, S2 and S3 of the monitor apparatus 1 is set univocally by the user, a video display of a supplied analog content can be displayed, being superposed on an informative message, which is displayed when the analog content is supplied inadvertently as digital data as shown in FIG. 10.

As described above, in the embodiment shown in FIG. 1, the DV storage 2, the MPEG-TS storage 3 and the DV camcoder 4 are connected to the monitor apparatus 1 by analog and digital signal cables. It should be noted, however, that the scope of the present invention is not limited to a network wherein each of the external apparatuses is connected to the monitor apparatus 1 by digital and analog signal cables. The present invention can also be applied to a case in which there are an external apparatus connected to the monitor apparatus 1 only by an analog signal cable as well as an external apparatus connected to the monitor apparatus 1 only by a digital signal cable.

In addition, in the embodiment, a circle mark on the active row of the content information table shown in FIG. 7 is used as a specifier for indicating which content information is now being selected in the monitor apparatus 1. Thus, network connection status can be displayed with a transmission in use emphasized as shown in FIG. 9 described earlier. In addition, the user of the monitor apparatus 1 and an external apparatus can be informed of which external apparatus is presently supplying a signal to the monitor apparatus 1.

In the display of the content information table shown in FIG. 7 on the screen of the display unit employed in the monitor apparatus 1, information on a content presently being used, that is, a source apparatus ID showing a source supplying a content being used in the current picture display and format information, may be displayed inversely or displayed in a blinking state to distinguish this information from information on contents, which are supplied from another external apparatus and not being currently used in the monitor apparatus 1.

In addition, the content information table created in the monitor apparatus 1 like the one shown in FIG. 7 can be effectively used in processes such as dubbing of digital data from an external apparatus connected to the network to another as follows.

Assuming for example that the DV camcoder 4 is supplying an analog content to the monitor apparatus 1 through the analog signal cable 10 in the network shown in FIG. 1, the user watching a video display of the analog content appearing on the screen of the display unit employed in the monitor apparatus 1 may want to copy the content currently being played back to another electronic apparatus.

In such a case, by referring to the content information table displayed on the screen of the display unit employed in the monitor apparatus 1 or the network connection status drawn on the screen, the user is capable of knowing the source apparatus, the compressing and encoding method and the information on encryption of the content currently being displayed on the screen. Thus, the user is capable of forming a judgment as to whether the DV storage 2 or the MPEG-TS storage 3 is capable of decrypting the signal correctly and, hence, properly copying the content.

In addition, in the case of the network shown in FIG. 1, assuming that the user determines the DV storage 2 to be the proper external apparatus capable of copying digital data generated by the DV camcoder 4, it is possible to issue a request for digital dubbing from the DV storage 2 to the DV camcoder 4. Such a request is initiated by issuing a command to the DV storage 2 to receive digital data from the DV camcoder 4 and record the data. Receiving such a command, the DV storage 2 outputs a request to the DV camcoder 4 to provide the digital data to the DV storage 2.

At the request issued by the DV storage 2 to the DV camcoder 4 to provide digital data, the DV camcoder 4 supplies the digital data to the DV storage 2, which then records the data. That is to say, the content supplied by the DV camcoder 4 to the monitor apparatus 1 as an analog signal can be stored in a recording medium employed in the DV storage 2 as digital data.

Automatic Selection of a Content Supply Route

As described before, the monitor apparatus 1 implemented by the embodiment displays the transmission channel number, the source apparatus ID and the format information of a content supplied to the monitor apparatus 1. As an alternative, the monitor apparatus 1 may display connection status of the network connecting the apparatus as a content information table, or draws the status on the screen.

Even if these pieces of information are displayed, nevertheless, it is quite within the bounds of possibility that a user not familiar with the monitor apparatus 1 or the external apparatuses connected to the monitor apparatus 1 by the network is not capable of quickly thinking of an idea as to how to operate the monitor apparatus 1 in order to display a video of a content the user wants to watch and listen to and, hence, not capable of dealing with the situation.

In order to solve the problem described above, the monitor apparatus 1 implemented by the embodiment is provided with an automatic select function for automatically selecting a content supply route. By setting the monitor apparatus 1 to execute this function, a route for supplying a digital content is automatically selected so that a video display of the content can be output even if the monitor apparatus 1 is not capable of decoding the digital data of the content. As a result, the monitor apparatus 1 is capable of outputting the video display of a digital content even if the monitor apparatus 1 is not capable of decoding the digital data of the content.

The automatic select function for automatically selecting a content supply route is set by storing information entered by operating the key operation unit 25 in the RAM 23 employed in the control unit 30. It is thus necessary to employ a non-volatile memory as the RAM 23 so that setting information stored in the RAM 23 remains stored even if the power supply of the monitor apparatus 1 is turned off. It is needless to say that, as an alternative, a non-volatile memory used dedicatedly for storing various kinds of setting information can also be provided separately from the RAM 23.

Figure 11:
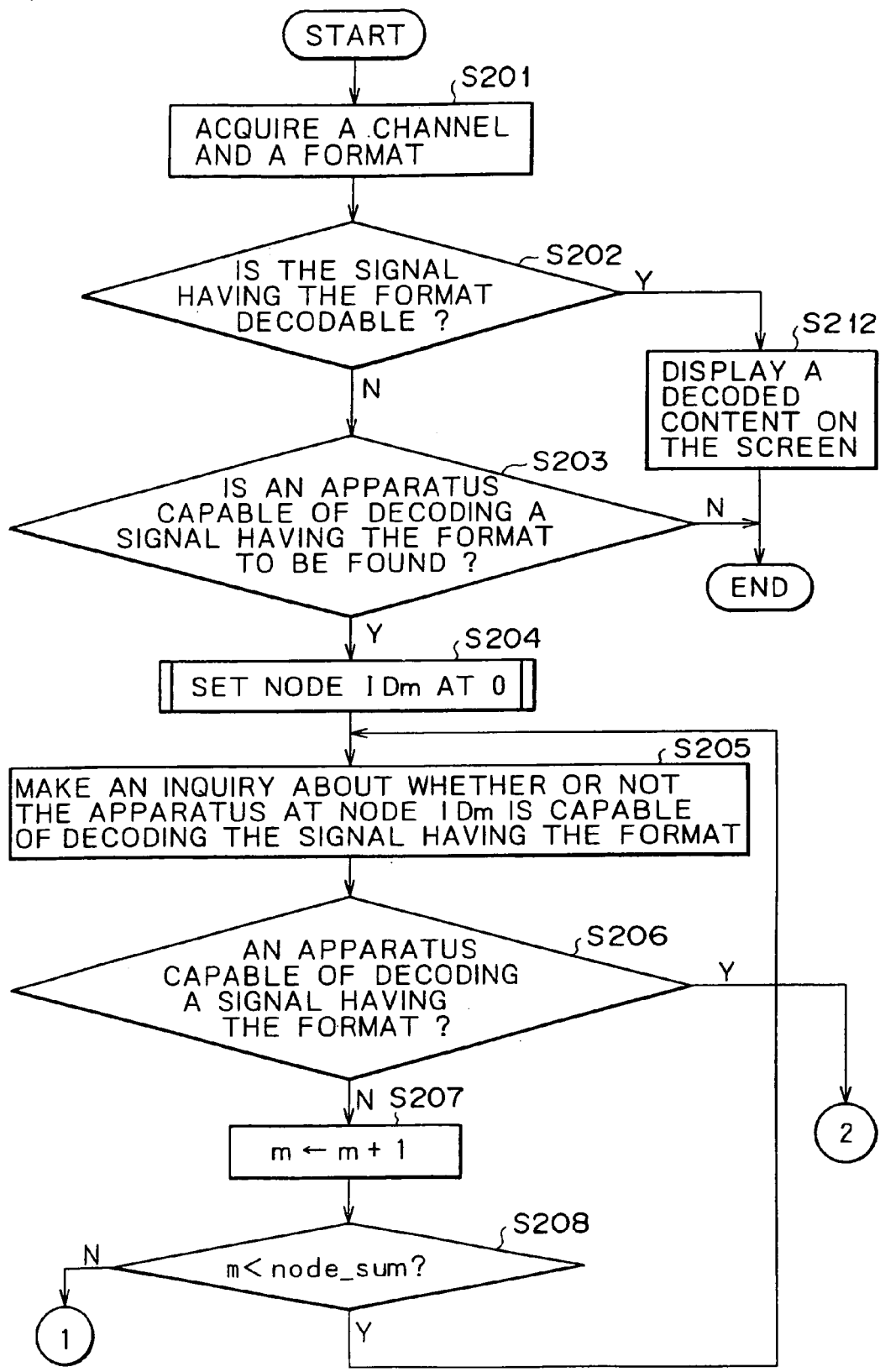
FIG. 11 shows an explanatory flowchart representing processing to automatically select a route for supplying a content in accordance with the present invention's method for selecting a route to supply a content.

If the automatic select function for automatically selecting a digital-content supply route stored in the RAM 23 is in an ON state, when the power supply of the monitor apparatus 1 implemented by the embodiment is turned on, the control unit 30 put in the digital external input mode described earlier carries out automatic select processing for automatically selecting a digital-content supply route in accordance with a flowchart shown in FIGS. 11 and 12.

As described before, with the digital external input mode set, the IEEE 1394 I/F circuit 14 controlled by the control unit 30 extracts isochronous packets of an isochronous channel assigned to an external apparatus specified by the user at a step S201. The IEEE 1394 I/F circuit 14 then obtains an isochronous channel number of the channel field and format information of the FMT field from the header of one of the isochronous packets, supplying the isochronous channel number and the format information to the control unit 30.

At the next step S202, the control unit 30 examines the format information received from the IEEE 1394 I/F circuit 14 to form a judgment as to whether or not digital data received through the isochronous channel has been compressed and encoded by adoption of a method that allows the monitor apparatus 1 to decode the digital data, that is, whether or not the digital data has a format that allows the monitor apparatus 1 to decode the digital data.

If the outcome of the judgment formed at the step S202 indicates that the digital data received through the isochronous channel has been compressed and encoded by adoption of a method, which allows the monitor apparatus 1 to decode the digital data, the flow of the processing goes on to a step S212 at which a digital content obtained as a result of a decoding process is displayed on the screen of the display unit employed in the apparatus in accordance with the processing carried out in the digital external input mode as described earlier. Then, the processing represented by the flowchart shown in FIGS. 11 and 12 is ended.

If the outcome of the judgment formed at the step S202 indicates that the digital data received through the isochronous channel has been compressed and encoded by adoption of a method, which does not allow the monitor apparatus 1 to decode the digital data, on the other hand, the flow of the processing goes on to a step S203 at which the user is informed that the digital data received through the isochronous channel cannot be decoded and requested to enter a response indicating a desire to terminate the operation to play back the content or a response indicating a desire to find an external apparatus capable of decoding the digital data. That is to say, the flow of the processing goes on to the step S203 to form a judgment as to whether or not to find an external apparatus capable of decoding the digital data.

If the outcome of the judgment formed at the step S203 indicates that the user wants to terminate the operation to play back the content, the processing represented by the flowchart shown in FIGS. 11 and 12 is merely ended. If the outcome of the judgment formed at the step S203 indicates that the user wants to find an external apparatus capable of decoding the digital data, on the other hand, the flow of the processing goes on to a step S204 at which the control unit 30 sets a variable m at 0. Then, at the next step S205, the IEEE 1394 I/F circuit 14 transmits an inquiry to an external apparatus with a node IDm through a digital bus by adoption of the isochronous communication method. The inquiry transmitted to the external apparatus is an inquiry about whether or not the external apparatus is capable of decoding the digital data, which was compressed and encoded by using a method indicated by the format information extracted at the step S201.

Then, at the next step S206, the control unit 30 forms a judgment as to whether or not a reply transmitted by the external apparatus with the node IDm through the digital bus and the IEEE 1394 I/F circuit 14 in response to the inquiry made at the step S205 indicates that the external apparatus is capable of decoding the digital data, which was compressed and encoded by using a method indicated by the format information.

If the outcome of the judgment formed at the step S206 suggests that the reply transmitted by the external apparatus with the node IDm indicates that the external apparatus is not capable of decoding the digital data, which was compressed and encoded by using a method indicated by the format information, the flow of the processing goes on to a step S207 at which the control unit 30 increments the variable m by 1. Then, the flow of the processing goes on to a next step S208 to form a judgment as to whether or not the variable m has exceeded a maximum value of the node ID.

If the outcome of the judgment formed at the step S208 suggests that the variable m has exceeded the maximum value of the node ID, the flow of the processing goes on to a step S211 of the continuation flowchart shown in FIG. 12. At the step S211, the control unit 30 displays a message on the screen of the display unit employed in the monitor apparatus 1 to notify the user that no external apparatus capable of decoding the digital data, which was compressed and encoded by using a method indicated by the format information, is connected to the network of the monitor apparatus 1. Then, the processing represented by the flowchart shown in FIGS. 11 and 12 is ended. If the outcome of the judgment formed at the step S208 suggests that the variable m has not exceeded the maximum value of the node ID, on the other hand, the flow of the processing goes back to the step S205 to repeat the processing from this step.

If the outcome of the judgment formed at the step S206 suggests that the reply transmitted by the external apparatus with the node IDm indicates that the external apparatus is capable of decoding the digital data, which was compressed and encoded by using a method indicated by the format information, on the other hand, the flow of the processing goes on to a step S209 of the continuation flowchart shown in FIG. 12. At the step S209, the control unit 30 requests the IEEE 1394 I/F circuit 14 to output a command to the external apparatus indicated by the node IDm through a digital bus to request that the external apparatus receive isochronous packets of an isochronous channel indicated by the isochronous channel number acquired at the step S201, decode the packets and transmit results of decoding as an analog signal to the monitor apparatus 1.

In addition, in this embodiment, each analog connection is associated with a digital connection, and a content information table explained before by referring to FIG. 7 is created in advance as described earlier. Thus, by examining the formats and the node ID (or node IDm) of an external apparatus capable of decoding digital data in the content information table, the control unit 30 is capable of finding an external apparatus capable of decoding the digital data compressed and encoded by the method indicated by the format information acquired at the step S201 and capable outputting results of decoding as an analog signal to the monitor apparatus 1. The control unit 30 is thereby also capable of identifying which analog input terminal of the monitor apparatus 1 is connected to the external apparatus.

Then, at the next step S210, the control unit 30 controls the superposition circuit 19 to output the analog signal received from the external apparatus through the analog input terminal as a result of decoding the digital data, which was compressed and encoded by the method indicated by the format information acquired at the step S201. Finally, the processing represented by the flowchart shown in FIGS. 11 and 12 is ended.

Figure 13A:
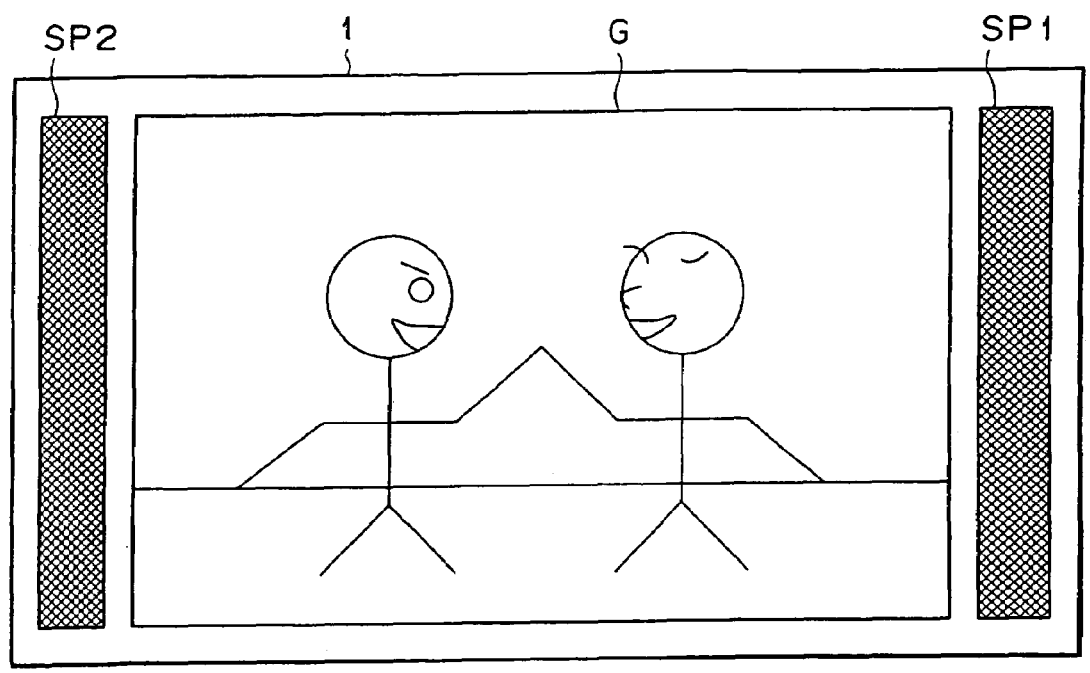
FIGS. 13A and 13B are explanatory diagrams showing typical video displays of digital contents supplied to the monitor apparatus by way of an automatically selected route for supplying the contents as analog signals to be displayed thereon.

As described above, when the monitor apparatus 1 receives digital data, which was compressed and encoded by a method making it impossible for the monitor apparatus 1 to decompress and decode the digital data, through the digital bus 5 and the IEEE 1394 I/F circuit 14, the monitor apparatus 1 reroutes the digital data to an external apparatus capable of decoding the data and supplying a result of the decoding as an analog signal back to the monitor apparatus 1. The monitor apparatus 1 is then capable of automatically outputting the analog signal representing the desired digital data as a video display on the screen G of the display unit employed in the monitor apparatus 1 as shown in FIG. 13A.

Figure 13B:
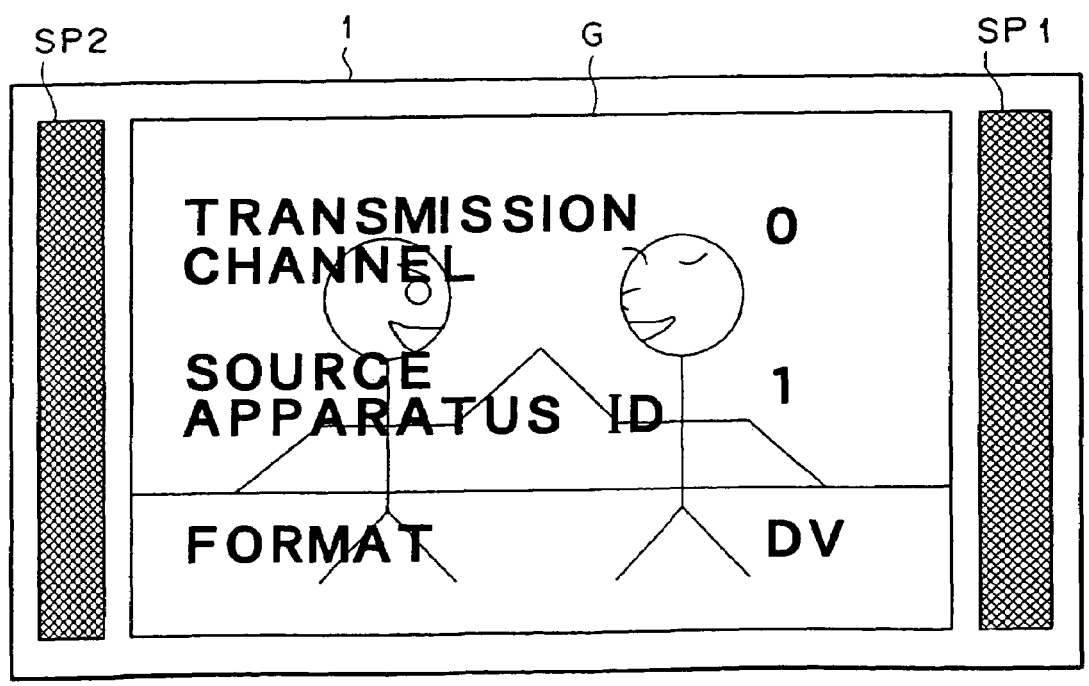

In addition, by creating a content information table in advance as described above, the message, which was displayed when a content was received as undecodable digital data, can be displayed, being superposed on the video display of the content received as an analog signal resulting from a process of decoding the digital data in an external apparatus as shown in FIG. 13B. With the message displayed on the screen as shown in this figure, the user is capable of knowing the source apparatus originally generating the content. In this example, the source apparatus originally generating the content is an external apparatus with a source apparatus ID of 1.

In the case of the network shown in FIG. 1, for example, a digital content generated by the DV storage 2 is rerouted to the DV camcoder 4 to be decoded thereby, being converted into an analog signal which is eventually-re-supplied to the monitor apparatus 1. In this way, the user is capable of watching and listening to a digital content generated by the DV storage 2 and initially supplied to the monitor apparatus 1 as a DV signal, which cannot be decoded by the monitor apparatus 1.

Thereby, the user of the monitor apparatus 1 is capable of watching and listening to video and audio outputs of a desired digital content played back by an external apparatus without the need to carry out a difficult operation on the monitor apparatus 1. As a result, a user not familiar with the monitor apparatus 1 or the external apparatuses connected to the monitor apparatus 1 by the network is capable of reliably watching and listening to a digital content played back and output by any one of the external apparatuses.

It should be noted that the judgment formed at the step S202 does not have to be based on format information extracted from the FMT field of the header of an isochronous packet. As described earlier, for example, digital data received by the IEEE 1394 I/F circuit 14 is decoded, and a result of the decoding can be used as a basis for forming a judgment as to whether or not the received digital data has been compressed and encoded by adoption of a method that makes it impossible for the monitor apparatus 1 to decompress and decode the data. That is to say, there are a variety of ways to form a judgment as to whether or not the received digital data has been compressed and encoded by adoption of a method that makes it impossible for the monitor apparatus 1 to decompress and decode the data.

As described earlier, the monitor apparatus 1 has the analog input terminals other than the terminals for the IEEE 1394 I/F circuit 14. It should be noted, however, that it is not always necessary to provide the monitor apparatus 1 with analog input terminals other than terminals for the IEEE 1394 I/F circuit 14. For example, in place of an analog input terminal, it is also possible to provide a digital input terminal for receiving an already decompressed base-band signal. With such a digital input terminal, the monitor apparatus 1 is capable of receiving an already decompressed base-band signal.

Since the base-band signal supplied to the digital input terminal has already been decompressed, it is not necessary for the monitor apparatus 1 to decompress or decode the signal. Instead, the base-band signal received by the monitor apparatus 1 is supplied to a D/A converter for producing a normally usable signal. To put it concretely, in place of the analog input terminals S1, S2 and S3, it is possible to provide digital input terminals each used for receiving an already decompressed base-band signal. Thus, the present invention can also be applied to a case wherein a base-band signal received from an external apparatus connected to the monitor apparatus 1 by the network is subjected to D/A conversion before being supplied to the superposition circuit 19.

That is to say, the present invention can be applied to not only a case wherein digital data encoded by adoption of some methods including a compressing and encoding method is not supplied to the monitor apparatus 1 as it is, but the digital data is subjected to decoding and D/A conversion in an external apparatus to generate an analog signal usable in the monitor apparatus 1 to supply thereto, but also a case wherein a usable analog signal is supplied to the monitor apparatus 1 as it is without being subjected to D/A conversion as described above.

It should be noted that, in the monitor apparatus 1 implemented by this embodiment, digital data decoded in the MPEG decoder 17 by adoption of the MPEG decoding method is subjected to D/A conversion in the superposition circuit 19.

In addition, while a route for supplying a content is automatically selected in the embodiment described above, the scope of the present invention is not limited to such a scheme. In an operation to dub a digital content in the network to which the monitor apparatus 1 is connected, for example, an external apparatus capable of copying the digital data generated by a desired source apparatus in a compressed state as it is is determined.

Then, a command is issued to the determined external apparatus to receive and copy the digital content generated by the desired source apparatus and, at the same time, a command is given to the source apparatus to output the digital data to the copying external apparatus. By issuing such commands, the external apparatus capable of copying the digital data generated by the desired source apparatus in a compressed state as it is automatically and normally copies and stores the data.

It should be noted that, in the embodiment described above, displayed information is not limited to a transmission channel, a source apparatus ID and format information. By displaying also information on a digital content received from a digital bus, information on a content received through an analog input terminal, information on whether or not digital data has been encrypted and the like, it is possible to clearly show the content supply route and the original condition of the content. The various kinds of information displayed are effective for identifying an external apparatus capable of copying data.

In addition, the monitor apparatus 1 implemented by the embodiment described above has a function, which is used for displaying pieces of information on a digital content supplied to the monitor apparatus 1 such as a transmission channel number (or an isochronous channel number), a source apparatus ID and format information as shown in FIG. 6 in case the monitor apparatus 1 is not capable of decoding the digital content. The monitor apparatus 1 also has a function to create a content information table, display part or all of the table and transmit part or all of the table to an external apparatus at a request made by the external apparatus. Furthermore, the monitor apparatus 1 also has an automatic select function for automatically selecting a content supply route.

However, it is also possible to provide a monitor apparatus having only the function, which is used for displaying pieces of information on a digital content supplied to the monitor apparatus 1 such as a transmission channel number (or an isochronous channel number), a source apparatus ID and format information in case the monitor apparatus 1 is not capable of decoding the digital content.

By the same token, it is also possible to provide a monitor apparatus having only the function to create a content information table, display part or all of the table and transmit part or all of the table to an external apparatus at a request made by the external apparatus. Likewise, it is also possible to provide a monitor apparatus having only the function for automatically selecting a content supply route. Similarly, it is also possible to provide a monitor apparatus having only any 2 of the 3 functions described above.

In addition, in the embodiment described above, information in the EMI field of an isochronous packet is used as a basis for forming a judgment as to whether or not incoming digital data has been encrypted. It should be noted, however, that the scope of the present invention is not limited to this scheme. For example, the level or another attribute of digital data supplied to the monitor apparatus 1 is detected to determine whether or not the digital data has been encrypted. That is to say, the formation of the judgment as to whether or not incoming digital data has been encrypted is based on the state of the digital data.

Furthermore, the embodiment described above is used for exemplifying an application of the present invention to a monitor apparatus. It is worth noting, however, that the scope of the present invention is not limited to a monitor apparatus. For example, the present invention can also be applied to an apparatus called a set top box for receiving a digital broadcast, a digital VTR and other electronic equipment such as a personal computer.

That is to say, the present invention can be applied to a variety of information outputting apparatuses each used for receiving digital data through a digital interface provided therein, carrying out processing such as a decoding process on the digital data and outputting results of the processing.

Thus, the present invention can be applied to not only a case for handling digital data comprising video and audio signals as described above, but also a case for handling other digital data such as computer programs and computer data.

Moreover, the embodiment described above is used for exemplifying the monitor apparatus 1 provided with a digital interface conforming to the IEEE 1394 standard. It should be noted, however, that the scope of the present invention is not limited to such a digital interface. That is to say, the present invention can also be applied to cases in which a variety of digital interfaces are employed for transmitting information on main digital data (or a digital content) besides the main digital data itself.

In addition, while the embodiment described above uses 2 types of compressing and encoding method, namely, the DV method and the MPEG-TS method, the scope of the present invention is not limited to these methods. That is to say, the present invention can also be applied to a case in which digital data cannot be decoded due to other differences in transmission format. As described above, for example, there are differences in encoding method between the DV, MPEG, JPEG and other methods, which result in the differences in transmission format. To put it concretely, the differences in transmission format include a difference in bit count per word and a difference in whether or not digital data has been encoded and, in the case of a packet transmission, differences in packet size, header size and header fields.

In the case of the digital television broadcasting, for example, a digital content may be broadcasted by adoption of typically a signal transmission method known in the US as a DSS method in addition to the MPEG-TS signal format. Furthermore, the DSS method can be an SD (standard definition) method or an HD (high definition) method. A receiver compatible with the DSS method may conceivably be capable of decoding digital data conforming to the SD method but not capable of decoding digital data conforming to the HD method. In a word, the present invention can also be applied to a system in which digital contents transmitted by digital broadcasting are encoded in accordance with different encoding methods and, hence, have different transmission formats.

That is to say, when the monitor apparatus 1 is not capable of decoding a broadcasted signal received from a digital television broadcasting station, the monitor apparatus 1 is capable of displaying the broadcast channel number, information on the format and other attributes of the digital television broadcasting. In this case, information extractable from the incoming broadcast signal is displayed. For example, information on a digital broadcast signal transmitted through a broadcasting channel is prepared in advance for each broadcasting channel in an electronic apparatus having a function for receiving the digital broadcast signal to be displayed and reported to the user.

What is claimed is:

1. An information-outputting apparatus connected to a network comprising a plurality of electronic apparatuses, said information-outputting apparatus comprising:

a digital interface unit for receiving a digital signal having a predetermined format;

signal-decoding means for decoding the digital signal;

decodable/undecodable judgment means for forming a judgment as to whether or not the digital signal received by said digital interface unit can be decoded by said signal-decoding means; and information-reporting means for reporting a source-apparatus information indicating an electronic apparatus serving as a source outputting said digital signal and an information on the predetermined format, wherein said information-reporting means further reports that the digital signal received by said digital interface unit is undecodable to a user by displaying said report on a display unit in case an outcome of a judgment formed by said decodable/undecodable judgment means indicates that said digital signal is undecodable.

2. An information-outputting apparatus according to claim 1, said apparatus further having information-tabularizing means for organizing source-apparatus information and information on a format, which are detected by said information-detecting means, for each of said electronic apparatuses connected to said network in a table by associating a pair of source-apparatus information and information on a format with said corresponding electronic apparatus, wherein said information-reporting means reports said information tabularized by said information-tabularizing means to the user.

3. An information-outputting apparatus according to claim 2, said apparatus having: one or more base-band-signal input terminals each connected to one of said electronic apparatuses connected to said network and used for receiving a base-band signal generated by said electronic apparatus; and information-adding means for adding source-apparatus information indicating a source apparatus generating a base-band signal and information, which indicates a format of said base-band signal in case said base-band signal has been encoded, for each of said electronic apparatuses connected to said base-band-signal input terminals to said information tabularized by said information-tabularizing means by associating said source-apparatus information with said information indicating a format.

4. An information-outputting apparatus according to claim 2, said apparatus having apparatus-pointing means for pointing out a source apparatus generating a signal presently displayed on a screen in said tabularized information.

5. An information-outputting apparatus according to claim 1, wherein said decodable/undecodable judgment means forms a judgment as to whether a digital signal received by said digital interface unit is decodable or undecodable on the basis of said information on a format detected by said information-detecting means.

6. An information-outputting apparatus according to claim 1, wherein said information-reporting means further outputs information as a sound or a voice generated by speakers.

7. An information-outputting apparatus according to claim 1, said information-outputting apparatus further having encrypted/unencrypted judgment means for forming a judgment as to whether or not a digital signal received by said digital interface unit has been encrypted, wherein said information-reporting means reports a result of said judgment formed by said encrypted/unencrypted judgment means to the user.

8. An information-outputting apparatus according to claim 7, wherein: said information-detecting means is also capable of detecting information indicating whether or not a digital signal received by said digital interface unit has been encrypted from said digital signal; and said encrypted/unencrypted judgment means forms a judgment as to whether or not a digital signal received by said digital interface unit has been encrypted on the basis of said information detected by said information-detecting means to indicate whether or not said digital signal received by said digital interface unit has been encrypted.

9. An information-outputting apparatus according to claim 2, wherein any one of said electronic apparatuses connected to said network is capable of arbitrarily making an access to said tabularized information.

10. An information-outputting apparatus according to claim 1, wherein said digital buses are each a bus conforming to the IEEE 1394 standard.

11. An information-outputting apparatus according to claim 1, wherein said information on a format is information indicating an encoding method of a digital signal supplied by way of said digital interface unit.

12. An information-outputting apparatus according to claim 1, wherein said information on a format is information indicating a transmission format of a digital signal supplied by way of said digital interface unit.

13. An information-outputting apparatus according to claim 1, wherein said information-reporting means reports a predetermined message in addition to said source-apparatus information and said information on a format to the user.

14. An information-outputting apparatus according to claim 1, wherein, after said information-reporting means reports said source-apparatus information and said information on a format to the user for a predetermined period of time, reporting is ended.

* * * * *